US009627908B2

(12) United States Patent
Kaminsky et al.

(10) Patent No.: US 9,627,908 B2
(45) Date of Patent: Apr. 18, 2017

(54) ULTRACAPACITOR AND BATTERY COMBINATION WITH ELECTRONIC MANAGEMENT SYSTEM

(71) Applicant: Maxwell Technologies, Inc., San Diego, CA (US)

(72) Inventors: Ilya Kaminsky, El Cajon, CA (US); Robert Shaw Lynds, San Diego, CA (US); Mikael Setterberg, La Jolla, CA (US); Priya Bendale, San Diego, CA (US); Ha Q. Hung, Escondido, CA (US); Thomas J. Dougherty, Waukesha, WI (US); John Miller, Oakridge, TN (US); Jeremy Cowperthwaite, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 751 days.

(21) Appl. No.: 13/797,545

(22) Filed: Mar. 12, 2013

(65) Prior Publication Data
US 2013/0264875 A1    Oct. 10, 2013

Related U.S. Application Data

(60) Provisional application No. 61/610,425, filed on Mar. 13, 2012, provisional application No. 61/610,417, (Continued)

(51) Int. Cl.
*H02J 7/00* (2006.01)
*H01G 9/28* (2006.01)
(Continued)

(52) U.S. Cl.
CPC .......... *H02J 7/0065* (2013.01); *H01G 9/28* (2013.01); *H01G 11/08* (2013.01); *H01M 2/02* (2013.01);
(Continued)

(58) Field of Classification Search
CPC ......... H02J 7/0065; H01G 9/28; H01G 11/08; H01M 16/00; H01M 2/02; H01M 2/10
See application file for complete search history.

(56) References Cited

U.S. PATENT DOCUMENTS 3,754,182 A * 8/1973 Morris ................ H02M 3/1563
                                                       323/285
4,697,134 A   9/1987 Burkum et al.
(Continued)

FOREIGN PATENT DOCUMENTS

CN         1701482       11/2005
CN         1701482 A     11/2005
(Continued)

OTHER PUBLICATIONS

Declaration of Thomas J. Dougherty dated May 2, 2016, in 2 pages.
(Continued)

*Primary Examiner* — Zeev V Kitov
(74) *Attorney, Agent, or Firm* — Knobbe Martens Olson & Bear LLP

(57) ABSTRACT

This disclosure provides systems, methods and apparatus for a combined battery/capacitor energy storage device. The device includes a first device terminal, a second device terminal, a battery connected between the first terminal and the second terminal, and a capacitor connected in parallel with the battery. In one aspect, a rectifier is connected between the first terminal and the capacitor, the rectifier configured to allow substantially unidirectional current flow from the first terminal to the capacitor. In another aspect, a switch is between the capacitor and the first terminal. In another aspect, a current limiter extends between the first terminal and the capacitor.

28 Claims, 18 Drawing Sheets

Related U.S. Application Data filed on Mar. 13, 2012, provisional application No. 61/610,399, filed on Mar. 13, 2012.

(51) Int. Cl.
| | | |
|---|---|---|
| *H01M 16/00* | (2006.01) | |
| *H01M 2/02* | (2006.01) | |
| *H01M 2/10* | (2006.01) | |
| *H01G 11/08* | (2013.01) | |

(52) U.S. Cl.
CPC ............ *H01M 2/10* (2013.01); *H01M 16/00* (2013.01); *Y02E 60/13* (2013.01); *Y02T 10/7022* (2013.01); *Y10T 29/435* (2015.01); *Y10T 29/49002* (2015.01); *Y10T 307/549* (2015.04)

(56) References Cited

U.S. PATENT DOCUMENTS

| | | | |
|---|---|---|---|
| 4,988,889 A * | 1/1991 | Oughton, Jr. | H02J 9/065 307/66 |
| 5,126,675 A | 6/1992 | Yang | |
| 5,776,633 A | 7/1998 | Mrotek et al. | |
| 5,783,322 A | 7/1998 | Nagai et al. | |
| 5,783,964 A * | 7/1998 | Eitan | G11O 5/141 327/143 |
| 5,808,443 A | 9/1998 | Lundstrom | |
| 5,821,006 A | 10/1998 | Patel et al. | |
| 5,849,426 A | 12/1998 | Thomas et al. | |
| 5,994,789 A | 11/1999 | Ochiai | |
| 6,057,666 A | 5/2000 | Dougherty et al. | |
| 6,222,341 B1 | 4/2001 | Dougherty et al. | |
| 6,271,642 B1 | 8/2001 | Dougherty et al. | |
| 6,373,152 B1 | 4/2002 | Wang et al. | |
| 6,387,553 B1 | 5/2002 | Putt et al. | |
| 6,392,348 B1 | 5/2002 | Dougherty | |
| 6,404,326 B1 | 6/2002 | Timmerman et al. | |
| 6,445,162 B1 | 9/2002 | Mukainakano | |
| 6,452,361 B2 | 9/2002 | Dougherty et al. | |
| 6,628,107 B1 | 9/2003 | Bang et al. | |
| 6,703,941 B1 | 3/2004 | Blaker | |
| 6,978,126 B1 | 12/2005 | Blaker et al. | |
| 7,119,518 B1 | 10/2006 | Dougherty et al. | |
| 7,193,390 B2 | 3/2007 | Nagai et al. | |
| 7,251,112 B2 * | 7/2007 | Fernald | H02H 7/18 361/82 |
| 7,307,830 B2 | 12/2007 | Gallay et al. | |
| 7,332,885 B2 | 2/2008 | Schnetzka et al. | |
| 7,469,129 B2 | 12/2008 | Blaker et al. | |
| 7,667,432 B2 | 2/2010 | West et al. | |
| 7,887,943 B2 | 2/2011 | Yoshikane et al. | |
| 8,174,357 B2 | 5/2012 | Geerlings et al. | |
| 8,264,333 B2 | 9/2012 | Blaker et al. | |
| 9,272,627 B2 | 3/2016 | Miller | |
| 9,300,018 B2 | 3/2016 | Watson et al. | |
| 2002/0008495 A1 | 1/2002 | Dougherty et al. | |
| 2002/0182480 A1 | 12/2002 | Hanauer et al. | |
| 2002/0190872 A1 | 12/2002 | Suman et al. | |
| 2003/0026092 A1 | 2/2003 | Reese et al. | |
| 2003/0236656 A1 | 12/2003 | Dougherty | |
| 2004/0018397 A1 | 1/2004 | Nagai et al. | |
| 2005/0003710 A1 | 1/2005 | Congdon et al. | |
| 2005/0078432 A1 | 4/2005 | Gallay et al. | |
| 2005/0083021 A1 | 4/2005 | Mahon | |
| 2005/0110468 A1 | 5/2005 | Turner et al. | |
| 2006/0098390 A1 | 5/2006 | Ashtiani et al. | |
| 2006/0119314 A1 | 6/2006 | Stephenson, III | |
| 2006/0247715 A1 | 11/2006 | Youker | |
| 2007/0047100 A1 * | 3/2007 | Takahashi | H02J 9/061 359/689 |
| 2008/0246443 A1 | 10/2008 | Doljack | |
| 2008/0268330 A1 | 10/2008 | Hansen et al. | |
| 2008/0315829 A1 | 12/2008 | Jones et al. | |
| 2009/0025207 A1 | 1/2009 | Youker | |
| 2009/0212626 A1 | 8/2009 | Snyder et al. | |
| 2009/0284076 A1 | 11/2009 | Lin et al. | |
| 2010/0060231 A1 | 3/2010 | Trainor et al. | |
| 2011/0189533 A1 | 8/2011 | Reis et al. | |
| 2011/0234171 A1 | 9/2011 | An et al. | |
| 2011/0293993 A1 | 12/2011 | Ryu | |
| 2011/0311876 A1 | 12/2011 | Sturgeon et al. | |
| 2012/0056549 A1 * | 3/2012 | Muramatsu | H05B 41/2882 315/223 |
| 2012/0235473 A1 | 9/2012 | Jiang et al. | |
| 2012/0235483 A1 | 9/2012 | Rigby et al. | |
| 2012/0235511 A1 | 9/2012 | Watson et al. | |
| 2012/0235624 A1 | 9/2012 | Sisk et al. | |
| 2012/0235642 A1 | 9/2012 | Mao et al. | |
| 2012/0237799 A1 | 9/2012 | Jiang et al. | |
| 2012/0301750 A1 | 11/2012 | Reis et al. | |
| 2012/0319471 A1 | 12/2012 | Miller | |
| 2013/0266824 A1 | 10/2013 | Cowperthwaite et al. | |
| 2013/0266825 A1 | 10/2013 | Cowperthwaite et al. | |
| 2013/0266826 A1 | 10/2013 | Cowperthwaite et al. | |
| 2016/0176298 A1 | 6/2016 | Watson et al. | |

FOREIGN PATENT DOCUMENTS

| | | |
|---|---|---|
| CN | 101888001 | 11/2010 |
| CN | 101888001 A | 11/2010 |
| CN | 102164780 | 8/2011 |
| CN | 102164780 A | 8/2011 |
| DE | 4225686 A1 | 3/1994 |
| DE | 10 2009 030016 A1 | 12/2010 |
| EP | 0 844 486 A2 | 5/1998 |
| EP | 0 844 486 A3 | 7/1998 |
| EP | 1 025 632 B1 | 4/2003 |
| EP | 1025632 | 4/2003 |
| EP | 1882850 | 1/2008 |
| EP | 1 720 231 B1 | 11/2009 |
| EP | 1 864 351 B1 | 9/2012 |
| EP | 1864351 | 9/2012 |
| GB | 2130735 A | 6/1984 |
| JP | S60-175361 | 9/1985 |
| JP | 2000-269077 | 9/2000 |
| JP | 2005-123504 | 5/2005 |
| JP | 3120348 | 3/2006 |
| WO | WO 93/25917 | 12/1993 |
| WO | WO 94/01914 | 1/1994 |
| WO | WO 99/14837 | 3/1999 |
| WO | WO 99/22434 | 5/1999 |
| WO | WO 99/41820 | 8/1999 |
| WO | WO 01/37393 | 5/2001 |
| WO | WO 01/37393 A1 | 5/2001 |
| WO | WO 03/001224 | 1/2003 |
| WO | WO 03/001224 A1 | 1/2003 |
| WO | WO 2006/118612 | 11/2006 |
| WO | WO 2006/118612 A1 | 11/2006 |
| WO | WO 2011 090511 | 7/2011 |
| WO | WO 2011/097196 A2 | 8/2011 |
| WO | WO 2011/097196 A3 | 8/2011 |
| WO | WO 2012 125954 | 9/2012 |
| WO | WO 2012/125963 A2 | 9/2012 |
| WO | WO 2012 125968 | 9/2012 |
| WO | WO 2012 125971 | 9/2012 |
| WO | WO 2012/129040 | 9/2012 |
| WO | WO 2012/129040 A2 | 9/2012 |

OTHER PUBLICATIONS

Dougherty, Thomas, Power Point Presentation, "The Use of Ultra Capacitors in Stop/Start and Traditional Vehicle Starting," presented Mar. 14, 2011, 13 pages.

Miller, John M., Power Point Presentation, "Electronic Design Webinar: One Powerful Day, Will the Markey Accept Battery-Ultracapacitor Combinations?" Maxwell Technologies, Oct. 15, 2008, 24 pages.

\* cited by examiner

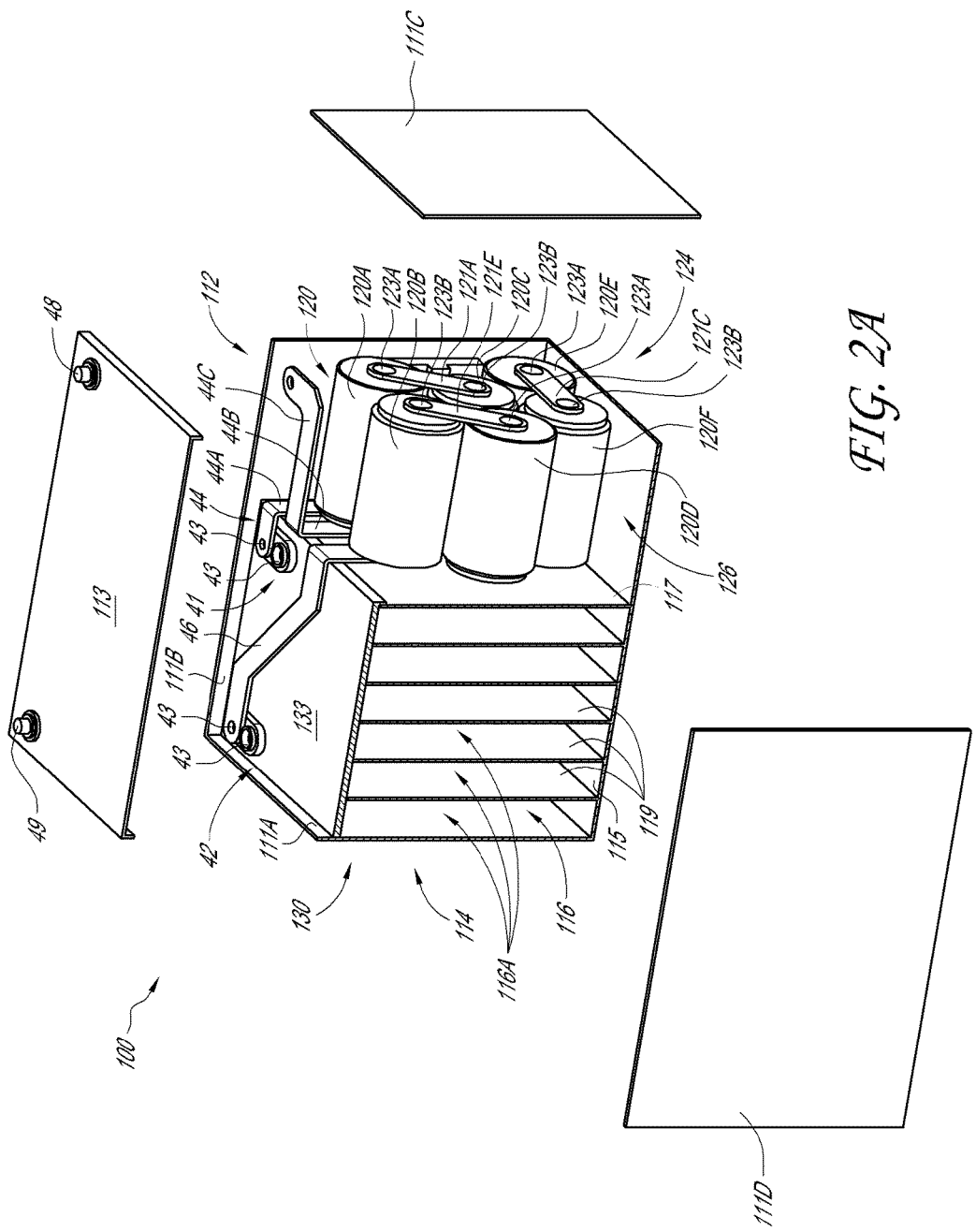

ULTRACAPACITOR AND BATTERY COMBINATION WITH ELECTRONIC MANAGEMENT SYSTEM

CROSS-REFERENCE TO RELATED APPLICATIONS

This application claims priority to U.S. Provisional patent application No. 61/610,425 filed Mar. 13, 2012 entitled "COMBINATION BATTERY AND ELECTRIC DOUBLE LAYER CAPACITOR," U.S. Provisional Patent Application No. 61/610,417 filed Mar. 13, 2012 entitled "ULTRACAPACITOR AND BATTERY COMBINATION WITH SWITCHED POWER MANAGEMENT SYSTEM" and U.S. Provisional Patent Application No. 61/610,399 filed Mar. 13, 2012 entitled "CAPACITOR AND BATTERY COMBINATION WITH VOLTAGE MANAGEMENT SYSTEM." The disclosures of these prior applications are considered part of, and are incorporated by reference in, this disclosure in its entirety.

BACKGROUND

Field

The present disclosure relates generally to a combined capacitor and battery combination, and related methods of making and using such combinations.

Description of the Related Art

Many different types of energy storage systems, such as systems including batteries or capacitors, are known. Such conventional energy storage systems may be implemented to provide power to other devices, such as a starter in a vehicle.

Conventional vehicle batteries have several limitations. One limitation is that a battery may have limited cycle efficiency, and thus may experience decreased recharge performance, or even completely lose its ability to charge after a given number of charge/discharge cycles. For example, the cycle efficiency of a battery may decrease when used in a vehicle that starts and stops the engine repeatedly, such as in a hybrid vehicle that engages a starter regularly to adjust from electric to gas power. The cycle efficiency of a battery may also be affected under some temperature conditions, as described further below. It will be understood that while reference is made herein to hybrid vehicles and vehicles with an internal combustion engine, embodiments described herein may be employed within other vehicle or non-vehicle systems.

Batteries are rated using several different measurements. For example, Cold Cranking Amps ("CCA") is a rating used in the battery industry to define a battery's ability to start an engine in cold temperatures. The rating is the number of amps a new, fully charged battery can deliver at 0° F. for 30 seconds, while maintaining a voltage of at least 7.2 volts, for a 12 volt battery. The higher the CCA rating, the greater the starting power of the battery.

The term "CA" means Cranking Amps, and is used to describe the discharge load in amperes which a new, fully charged battery at 32° F. (0° C.), can continuously deliver for 30 seconds and maintain a terminal voltage equal or greater than 1.2 volts per cell. It is sometimes referred to as Marine Cranking Amps. In addition, the term Reserve Capacity ("RC") is a term used to define the ability of a battery to power a vehicle with an inoperative alternator or fan belt. The rating is the number of minutes a battery at 80° F. can be discharged at 25 amps and maintain a voltage of 10.5 volts for a 12 volt battery. The higher the reserve rating, the longer a vehicle can operate should the alternator or fan belt fail.

SUMMARY

The systems, methods and devices of this disclosure each have several innovative aspects, no single one of which is solely responsible for the desirable attributes disclosed herein.

One innovative aspect of the subject matter described in this disclosure can be implemented in an energy storage device. The energy storage device includes a first device terminal and a second device terminal. The energy storage device includes a battery connected between the first terminal and the second terminal. The energy storage device includes a capacitor connected in parallel with the battery. The energy storage device includes a rectifier connected between the first terminal and the capacitor. The rectifier is configured to allow substantially unidirectional current flow from the first terminal to the capacitor.

Another innovative aspect of the subject matter described in this disclosure can be implemented in an energy storage device. The energy storage device includes a first device terminal and a second device terminal. The energy storage device includes a battery connected between the first terminal and the second terminal. The energy storage device includes a capacitor connected in parallel with the battery. The energy storage device includes a first switch between the capacitor and the first terminal. The first switch is configured to selectively control electrical communication between the capacitor and the first terminal.

Another innovative aspect of the subject matter described in this disclosure can be implemented in an energy storage device. The energy storage device includes a first device terminal and a second device terminal. The energy storage device includes a capacitor connected between the first terminal and the second terminal. The energy storage device includes a first battery connected in parallel with the capacitor. The energy storage device includes a second battery connected in parallel with and between the first battery and the capacitor. The energy storage device includes a first rectifier connected in parallel with and between the first battery and the second battery. The energy storage device includes a second rectifier connected between the second terminal and the first rectifier. The energy storage device includes a third rectifier connected between the first rectifier and the first terminal.

Another innovative aspect of the subject matter described in this disclosure can be implemented in an energy storage device. The energy storage device includes a first positive device terminal configured to receive power from a power source. The energy storage device includes a second device terminal comprising a negative or ground terminal. The energy storage device includes a battery connected between the first terminal and the second terminal. The energy storage device includes a capacitor connected in parallel with the battery. The energy storage device includes a current limiter extending between the first terminal and the capacitor, the current limiter configured to reduce current draw from the battery when the capacitor powers an external device.

Another innovative aspect of the subject matter described in this disclosure can be implemented in a self-balancing combined battery/capacitor energy storage device. The energy storage device includes a first positive device terminal configured to receive power from a power source. The energy storage device includes a second device terminal comprising a negative or ground terminal. The energy storage device includes a battery bank comprising two or more batteries connected in series between the first terminal and the second terminal. The energy storage device includes a capacitor bank comprising two or more capacitors connected in series. The capacitor bank is connected in parallel with the battery bank. The energy storage device includes one or more interconnects extending between the battery bank and the capacitor bank, wherein each interconnect includes a first end connected to a node between a corresponding adjacent pair of capacitors in the capacitor bank, and a second end connected to a node between a corresponding adjacent pair of batteries.

Details of one or more implementations of the subject matter described in this disclosure are set forth in the accompanying drawings and the description below. Although the examples provided in this disclosure are primarily described in terms of a vehicle system, the concepts provided herein may apply to other types of systems with or within which an energy storage system is implemented. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a front perspective cross-sectional cutaway and exploded view of an embodiment of a two-terminal capacitor/battery combination energy storage device.

Like reference numbers and designations in the various drawings indicate like elements.

DESCRIPTION

Figure 1:
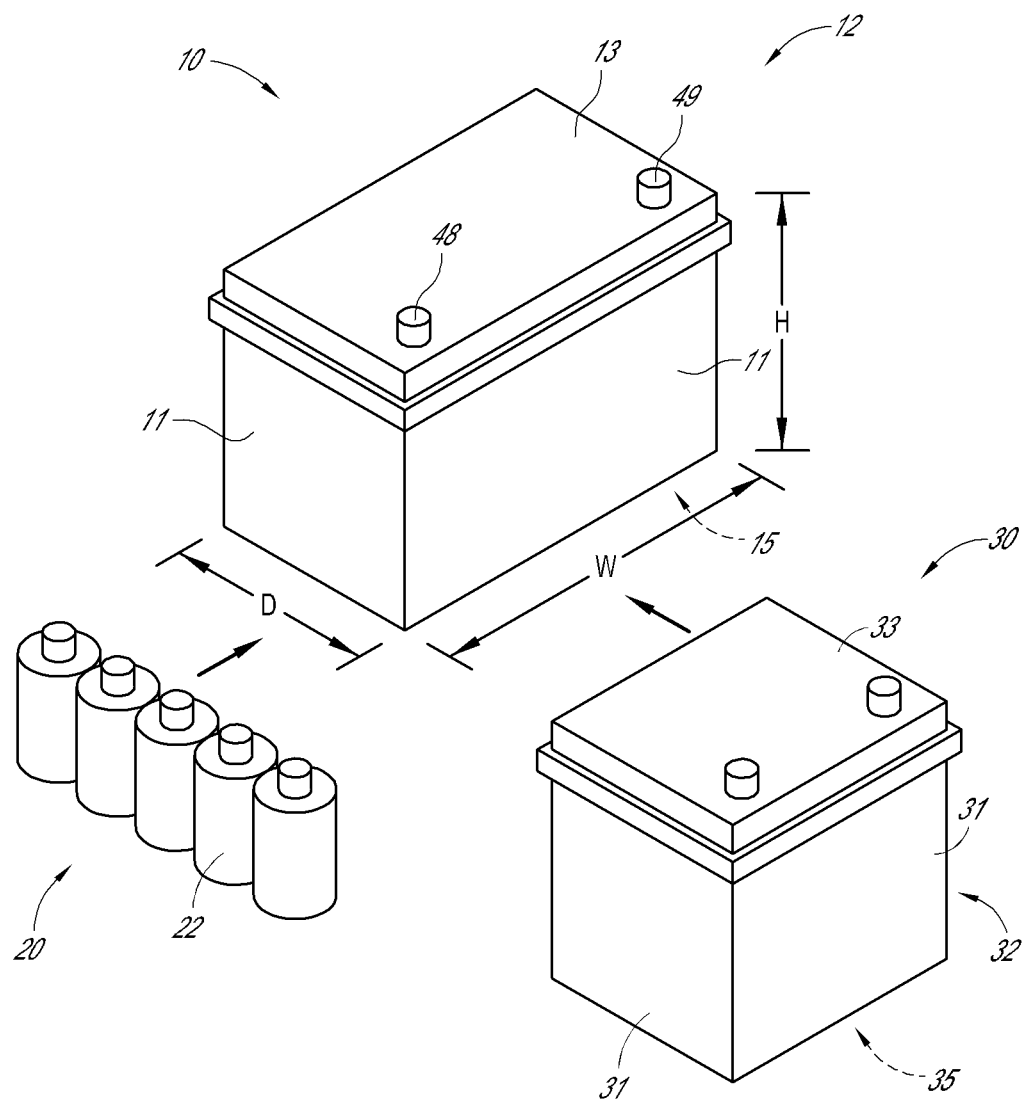
FIG. 1 illustrates an embodiment of a capacitor/battery combination energy storage device.

Some embodiments of the invention relate to systems and methods of providing a combination energy storage device that includes a battery system in combination with a capacitor system. In some embodiments, the battery system may have one or more batteries and the capacitor system may have one or more capacitors. The capacitors may be based on various technologies, such as an ultracapacitor, also known as a supercapacitor or electric double-layer capacitor. Examples of ultracapacitors can be found, for example, in U.S. Pat. Nos. 7,791,860; 7,352,558; 7,342,770; 8,072,734; and 7,508,651. Examples of combined battery and ultracapacitor devices can be found, for example, in U.S. Patent Application Publication No. 2012/0237799, which is considered part of, and is incorporated by reference in, this disclosure in its entirety. It will be understood that while reference is made herein to an "EDLC" (electric double layer capacitor), or ultracapacitor, the embodiments described herein can be implemented with other types of capacitors, and should not be limited to EDLCs or ultracapacitors.

In one embodiment, the combined energy storage device includes a battery and a capacitor in a single, integrated package. In some embodiments, a symmetric capacitor, in which a similar material is used for both electrodes, may be employed. In some embodiments, an asymmetric capacitor, in which different materials are used for the two electrodes, may be employed. In another embodiment, the combined energy storage device includes a single, integrated package that is of similar size to the standard vehicle non-hybrid batteries available on the open market ("OEM" batteries).

Unless otherwise specified, the singular or plural form of a "capacitor" and "battery" as described herein can refer to a single capacitor or battery, respectively, or a plurality of capacitors or batteries, respectively, as in a capacitor bank or battery bank connected in series or in parallel. Implementing a capacitor in combination with a battery in a combined battery/capacitor energy storage device can help reduce or mitigate one or more of the aforementioned limitations of an energy storage system that includes only a battery for energy storage.

For example, a capacitor generally can sustain an increased number of discharge/charge cycles, and thus has a longer cycle life, than a comparable battery. A combined energy storage device that uses a capacitor in combination with a battery may thus provide improved cycle life, and may provide benefits to an application with increased charge/discharge cycles, such as a start/stop application.

A capacitor generally may also provide a more efficient delivery of power, and a quicker charge and discharge time than a comparable battery. Such improved capacitor efficiency may result from the generally more efficient charge acceptance, higher discharge rate and faster chemical kinetics, of a capacitor relative to a comparable battery. A capacitor may also have a lower equivalent series resistance (ESR) than the resistance of a comparable battery. Thus, as described herein, a capacitor generally does not experience the aforementioned drop in voltage as a battery may, when a power supply, such as an alternator stops charging. Similarly, a capacitor also has a reduced tendency to "cycle down" over time with respect to that of a battery. A capacitor used in combination with a battery was found to reduce the peak current stress experienced by the battery during use.

A capacitor may also generally be less susceptible to some temperature effects than a battery. For example, a capacitor can sustain a charge and/or retain higher voltages at lower temperatures, and thus can deliver higher power, than a comparable battery at the same temperature, or a comparable capacitor at a higher temperature. Such aspects of a capacitor were found to provide improved performance, for example, of a vehicle ignition system when the capacitor was used to provide power to a starter.

Additionally, when a capacitor is disconnected from an alternator or other power source, it has higher output voltage, or open circuit voltage, and exhibits lower voltage drop under load than a comparable battery under similar conditions. Such decreased voltage drop of a capacitor can also translate into increased cranking power, and thus a faster crank speed of a vehicle starter, when the capacitor is employed within a vehicle energy storage system. The aforementioned improvements in the voltage drop of a capacitor may be enhanced at lower temperature conditions.

Additionally, a capacitor used in combination with a battery in an energy storage device was found to provide a reserve or backup energy source in the event of reduced battery performance or failure (for example, to provide emergency lighting power, starter, or alternator power).

One embodiment is a battery and ultracapacitor combination in a combined energy storage device. The battery and ultracapacitor can be packaged together in a combination device in a number of different ways. For example, some embodiments include a combined battery/capacitor storage device that forms a battery system for a "drop-in" replacement for one or more batteries in a vehicular battery system, such as a Battery Council International (BCI) Group 31 battery. Of course, one of ordinary skill in the art could use teachings of the present disclosure to create combined capacitor/battery systems that are designed to meet other OEM sizes and standards, such as those in the BCI Groups, as described further below. As such, some embodiments include a combined battery/capacitor storage device that has a housing of substantially the same dimensions, mounting features and/or terminals of similar positioning and/or size, and/or similar output ratings, as an OEM battery. For example, in some embodiments, the battery and ultracapacitor are selected to provide output of 6 or 12 volts, and the standard form factor conforms to a corresponding 6 or 12 volt battery. In some embodiments, the standard form factor conforms to a standard for a lead-acid battery. In some embodiments, output of the battery and ultracapacitor and a form factor of the enclosure conform to a standard voltage rating and a standard form factor to permit retrofitting of a battery that comprises one or more conventional storage cells without an ultracapacitor. Some embodiments include methods for making such a battery system, comprising, in an enclosure that conforms to a standard form factor, disposing a battery and at least one ultracapacitor coupled to the battery to provide electrical energy via battery terminals external to the combined hybrid energy storage device. Some embodiments include providing an assembly of the energy storage device described herein, with at least one adapter that adapts the enclosure for mounting in place of a standard form factor for a battery that comprises one or more conventional storage cells without an ultracapacitor. The enclosure can be smaller than the standard form factor for the battery in the place of which it is to be mounted, or can be differently shaped than the standard form factor for the battery in the place of which it is to be mounted.

Also described herein are embodiments of a combined battery capacitor device with various electrical components and configurations to provide improved performance and control to the combined battery capacitor device.

Battery/Capacitor Combination

FIG. 1 illustrates an embodiment of a hybrid capacitor/battery combination energy storage device 10. Hybrid device 10 can include an enclosure or housing 12 forming an interior cavity into which one or more capacitors 20 (e.g., EDLCs) and a battery 30 can be placed. Housing 12 can comprise sidewalls 11, a lid 13, and a base 15 to form its interior cavity. Lid 13 can be permanently or removably attached to the remainder of housing 12. External device terminals 48 and 49 can be attached to lid 13 and be configured to connect device 10 to an external system. The device terminals 48 and 49 can be sized and shaped to correspond to an external battery terminal for a standard form factor battery. In some embodiments, the device 10 can include a third device terminal, to provide additional functionality, as described in some of the embodiments herein. The terminals can extend from at least one of a top, front and side location on the housing 12.

The device 10 can be sized with a height H, width W and depth D to conform to a standard OEM battery, such as any one or more of the BCI Group sizes listed in the following Table 1:

TABLE 1

| BCI Group Number | Typical Maximum Overall Dimensions | | | | | |
|---|---|---|---|---|---|---|
| | Millimeters | | | Inches | | |
| | W | D | H | W | D | H |
| PASSENGER CAR AND LIGHT COMMERCIAL_BATTERIES 12-VOLT (6 CELLS) | | | | | | |
| 21 | 208 | 173 | 222 | 8³/₁₆ | 6¹³/₁₆ | 8¾ |
| 22F | 241 | 175 | 211 | 9½ | 6⅞ | 8⁵/₁₆ |
| 22HF | 241 | 175 | 229 | 9½ | 6⅞ | 9 |
| 22NF | 240 | 140 | 227 | 9⁷/₁₆ | 5½ | 8¹⁵/₁₆ |
| 22R | 229 | 175 | 211 | 9 | 6⅞ | 8⁵/₁₆ |

TABLE 1-continued

| BCI Group Number | Typical Maximum Overall Dimensions | | | | | |
|---|---|---|---|---|---|---|
| | Millimeters | | | Inches | | |
| | W | D | H | W | D | H |
| 24 | 260 | 173 | 225 | 10¼ | 6¹³⁄₁₆ | 8⅞ |
| 24F | 273 | 173 | 229 | 10¾ | 6¹³⁄₁₆ | 9 |
| 24H | 260 | 173 | 238 | 10¼ | 6¹³⁄₁₆ | 9⅜ |
| 24R | 260 | 173 | 229 | 10¼ | 6¹³⁄₁₆ | 9 |
| 24T | 260 | 173 | 248 | 10¼ | 6¹³⁄₁₆ | 9¾ |
| 25 | 230 | 175 | 225 | 9¹⁄₁₆ | 6⅞ | 8⅞ |
| 26 | 208 | 173 | 197 | 8³⁄₁₆ | 6¹³⁄₁₆ | 7¾ |
| 26R | 208 | 173 | 197 | 8³⁄₁₆ | 6¹³⁄₁₆ | 7¾ |
| 27 | 306 | 173 | 225 | 12¹⁄₁₆ | 6¹³⁄₁₆ | 8⅞ |
| 27F | 318 | 173 | 227 | 12½ | 6¹³⁄₁₆ | 8¹⁵⁄₁₆ |
| 27H | 298 | 173 | 235 | 11¾ | 6¹³⁄₁₆ | 9¼ |
| 29NF | 330 | 140 | 227 | 13 | 5½ | 8¹⁵⁄₁₆ |
| 33 | 338 | 173 | 238 | 13⁵⁄₁₆ | 6¹³⁄₁₆ | 9⅜ |
| 34 | 260 | 173 | 200 | 10¼ | 6¹³⁄₁₆ | 7⅞ |
| 34R | 260 | 173 | 200 | 10¼ | 6¹³⁄₁₆ | 7⅞ |
| 35 | 230 | 175 | 225 | 9¹⁄₁₆ | 6⅞ | 8⅞ |
| 36R | 263 | 183 | 206 | 10⅜ | 7¼ | 8⅛ |
| 40R | 277 | 175 | 175 | 10¹⁵⁄₁₆ | 6⅞ | 6⅞ |
| 41 | 293 | 175 | 175 | 11¹³⁄₁₆ | 6⅞ | 6⅞ |
| 42 | 243 | 173 | 173 | 9⁵⁄₁₆ | 6¹³⁄₁₆ | 6¹³⁄₁₆ |
| 43 | 334 | 175 | 205 | 13⅛ | 6⅞ | 8¹⁄₁₆ |
| 45 | 240 | 140 | 227 | 9⁷⁄₁₆ | 5½ | 8¹⁵⁄₁₆ |
| 46 | 273 | 173 | 229 | 10¾ | 6¹³⁄₁₆ | 9 |
| 47 | 246 | 175 | 190 | 9¹¹⁄₁₆ | 6⅞ | 7½ |
| 48 | 306 | 175 | 192 | 12¹⁄₁₆ | 6⅞ | 7⁹⁄₁₆ |
| 49 | 381 | 175 | 192 | 15 | 6⅞ | 7⁹⁄₁₆ |
| 50 | 343 | 127 | 254 | 13½ | 5 | 10 |
| 51 | 238 | 129 | 223 | 9⅜ | 5¹⁄₁₆ | 8¹³⁄₁₆ |
| 51R | 238 | 129 | 223 | 9⅜ | 5¹⁄₁₆ | 8¹³⁄₁₆ |
| 52 | 186 | 147 | 210 | 7⁵⁄₁₆ | 5¹³⁄₁₆ | 8¼ |
| 53 | 330 | 119 | 210 | 13 | 4¹¹⁄₁₆ | 8¼ |
| 54 | 186 | 154 | 212 | 7⁵⁄₁₆ | 6¹⁄₁₆ | 8⅜ |
| 55 | 218 | 154 | 212 | 8⅝ | 6¹⁄₁₆ | 8⅜ |
| 56 | 254 | 154 | 212 | 10 | 6¹⁄₁₆ | 8⅜ |
| 57 | 205 | 183 | 177 | 8¹⁄₁₆ | 7³⁄₁₆ | 6¹⁵⁄₁₆ |
| 58 | 255 | 183 | 177 | 10¹⁄₁₆ | 7³⁄₁₆ | 6¹⁵⁄₁₆ |
| 58R | 255 | 183 | 177 | 10¹⁄₁₆ | 7³⁄₁₆ | 6¹⁵⁄₁₆ |
| 59 | 255 | 193 | 196 | 10¹⁄₁₆ | 7⅝ | 7¾ |
| 60 | 332 | 160 | 225 | 13¹⁄₁₆ | 6⁵⁄₁₆ | 8⅞ |
| 61 | 192 | 162 | 225 | 7⁹⁄₁₆ | 6⅜ | 8⅞ |
| 62 | 225 | 162 | 225 | 8⅞ | 6⅜ | 8⅞ |
| 63 | 258 | 162 | 225 | 10³⁄₁₆ | 6⅜ | 8⅞ |
| 64 | 296 | 162 | 225 | 11¹¹⁄₁₆ | 6⅜ | 8⅞ |
| 65 | 306 | 190 | 192 | 12¹⁄₁₆ | 7½ | 7⁹⁄₁₆ |
| 70 | 208 | 179 | 196 | 8³⁄₁₆ | 7¹⁄₁₆ | 7¹¹⁄₁₆ |
| 71 | 208 | 179 | 216 | 8³⁄₁₆ | 7¹⁄₁₆ | 8½ |
| 72 | 230 | 179 | 210 | 9¹⁄₁₆ | 7¹⁄₁₆ | 8¼ |
| 73 | 230 | 179 | 216 | 9¹⁄₁₆ | 7¹⁄₁₆ | 8½ |
| 74 | 260 | 184 | 222 | 10¼ | 7¼ | 8¾ |
| 75 | 230 | 179 | 196 | 9¹⁄₁₆ | 7¹⁄₁₆ | 7¹¹⁄₁₆ |
| 76 | 334 | 179 | 216 | 13⅛ | 7¹⁄₁₆ | 8½ |
| 78 | 260 | 179 | 196 | 10¼ | 7¹⁄₁₆ | 7¹¹⁄₁₆ |
| 85 | 230 | 173 | 203 | 9¹⁄₁₆ | 6¹³⁄₁₆ | 8 |
| 86 | 230 | 173 | 203 | 9¹⁄₁₆ | 6¹³⁄₁₆ | 8 |
| 90 | 246 | 175 | 175 | 9¹¹⁄₁₆ | 6⅞ | 6⅞ |
| 91 | 280 | 175 | 175 | 11 | 6⅞ | 6⅞ |
| 92 | 317 | 175 | 175 | 12½ | 6⅞ | 6⅞ |
| 93 | 354 | 175 | 175 | 15 | 6⅞ | 6⅞ |
| 95R | 394 | 175 | 190 | 15⁹⁄₁₆ | 6⅞ | 7½ |
| 96R | 242 | 173 | 175 | 9⁹⁄₁₆ | 6¹³⁄₁₆ | 6⅞ |
| 97R | 252 | 175 | 190 | 9¹⁵⁄₁₆ | 6⅞ | 7½ |
| 98R | 283 | 175 | 190 | 1¹³⁄₁₆ | 6⅞ | 7½ |
| PASSENGER CAR AND LIGHT COMMERCIAL BATTERIES 6-VOLT(3 CELLS) | | | | | | |
| 1 | 232 | 181 | 238 | 9⅛ | 7⅛ | 9⅜ |
| 2 | 264 | 181 | 238 | 10⅜ | 7⅛ | 9⅜ |
| 2E | 492 | 105 | 232 | 19⁷⁄₁₆ | 4⅛ | 9¼ |
| 2N | 254 | 141 | 227 | 10 | 5⁹⁄₁₆ | 8¹⁵⁄₁₆ |
| 17HF | 187 | 175 | 229 | 7⅜ | 6⅞ | 9 |
| HEAVY-DUTY COMMERCIAL BATTERIES 12-VOLT (6 CELLS) | | | | | | |
| 4D | 527 | 222 | 250 | 20¾ | 8¾ | 9⅞ |
| 6D | 527 | 254 | 260 | 20¾ | 10 | 10¼ |
| 8D | 527 | 283 | 250 | 20¾ | 11⅛ | 9⅞ |
| 28 | 261 | 173 | 240 | 10⁵⁄₁₆ | 6¹³⁄₁₆ | 9⁷⁄₁₆ |
| 29H | 334 | 171 | 232 | 13⅛ | 6¾ | 9⅛ 10 |
| 30H | 343 | 173 | 235 | 13½ | 6¹³⁄₁₆ | 9¼ 10 |
| 31 | 330 | 173 | 240 | 13 | 6¹³⁄₁₈ | 9⁷⁄₁₆ |
| ELECTRIC VEHICLE BATTERIES 6-VOLT (3CELLS) | | | | | | |
| GC2 | 264 | 183 | 270 | 10⅜ | 7³⁄₁₆ | 10⅝ |
| GC2H | 264 | 183 | 295 | 10⅜ | 7³⁄₁₆ | 11⅝ |

The approximate maximum heights listed in Table 1 include the terminal posts. Width and length measurements are generally to the widest point, including protruding flanges, except for hold-down flanges at the bottom of the battery. It will be understood that other OEM sizes can be implemented, including BCI Group sizes not listed, such as Heavy-Duty Motor Coach, Bus, and Special Tractor Batteries.

Referring again to FIG. 1, the EDLC 20 can include electrodes and electrolyte contained within a housing 22 of each EDLC, as is known in the art. A plurality of the EDLCs 20 can be electrically connected in series or in parallel to form a capacitor bank. The battery 30 can include a housing 32 with an interior battery cavity configured to contain battery plates, electrolyte and other components, as is known in the art. Housing 32 of the battery 30 can include a lid 33, base 35, and sidewalls 31 to form its interior cavity. The battery 30 can be a standard OEM battery, such as a BCI Group size. The embodiment in FIG. 1 may include additional packaging material and structure, as it includes the housings 22, 32 for the EDLCs 20 and battery 30, respectively, and the housing 12 for the overall hybrid device 10.

Some embodiments herein integrate existing internal parts of a battery, such as the plates, electrolyte, etc., into a housing configured to receive both the battery and the EDLC pack, to provide the combination energy storage device. Such embodiments reduce the number of parts and manufacturing costs related to such a device. Additionally, some embodiments allow a device with increased battery and/or capacitor charge capacity to be fit into a similar space as an embodiment of a device that uses both prepackaged capacitors and batteries within an additional external package. For example, in one embodiment, a 42 amp-hour rated device with an integrated package that houses internal battery components and an ELDC pack was fit within a comparable space envelope of a 30 amp-hour rated device with prepackaged capacitors and batteries enclosed within an additional housing. An integrated battery housing also provides improved heat transfer and thermal dissipation from the battery, as there is no insulating layer between an internal battery compartment and external combination energy storage device housing.

EDLC pack at the side of battery

Figure 2B:
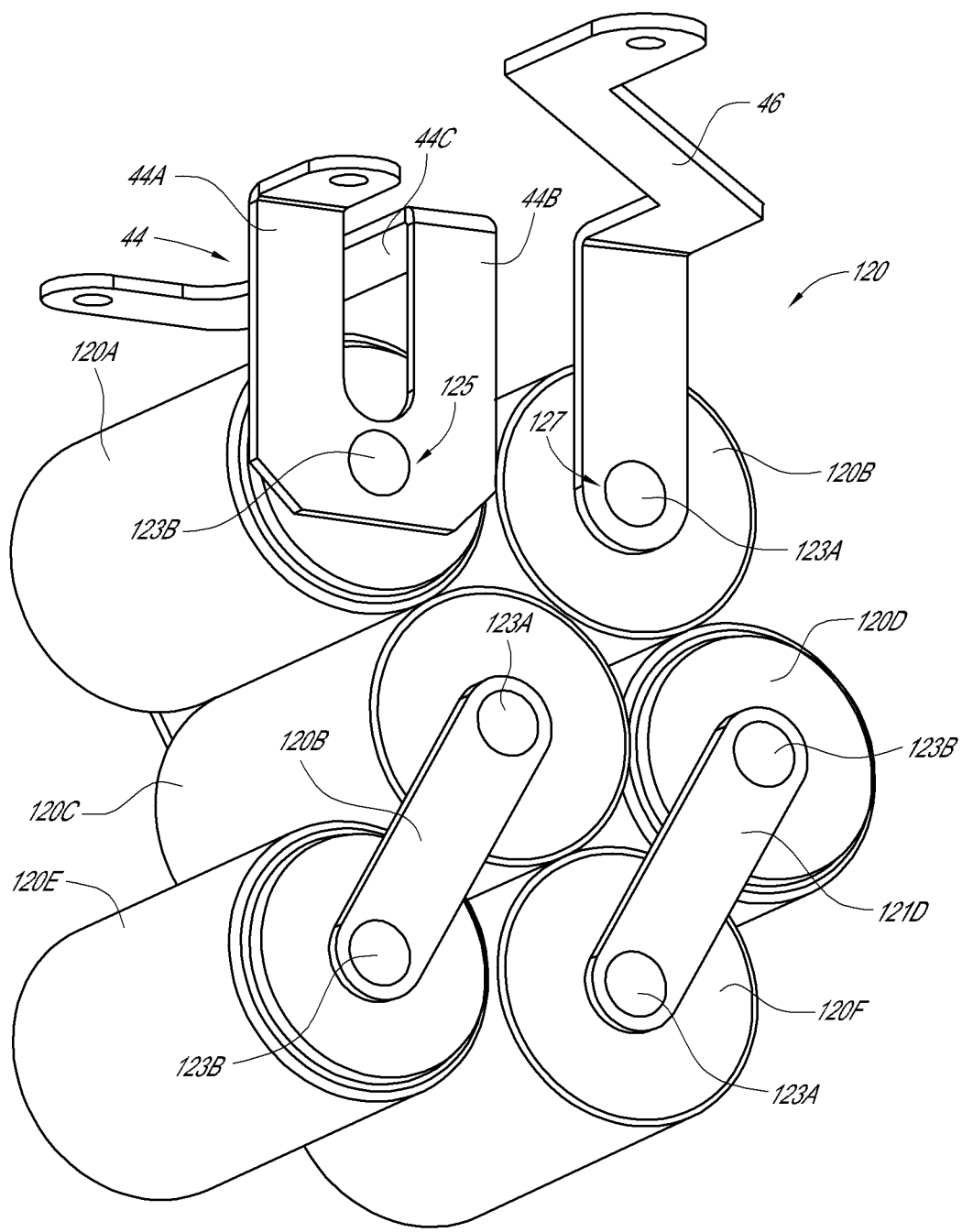
FIG. 2B is a left perspective view of a capacitor bank that can be implemented within a capacitor/battery combination energy storage device.

FIG. 2A is a front perspective cross-sectional cutaway and exploded view of an embodiment of an integrated capacitor/battery device 100. Device 100 can include a battery 130 and capacitor 120, and be similar to device 10, battery 30 and capacitor 20 in FIG. 1. The capacitor 120 can comprise a capacitor bank including a plurality of capacitor cells 120A-120F, positioned in parallel or series. The number of capacitor cells 120A-120F can vary, and six are shown for illustrative purposes. The electrical connections between capacitor cells 120A-120F and the other components of device 100 are described further below with reference to FIGS. 2B, 6A and 6B.

Continuing to refer to FIG. 2A, the device 100 can include a device housing 112 comprising one or more sidewalls 111A-111D, a base 115, and a lid 113. The device housing 112 can include a battery housing portion 114 with an interior battery cavity 116 configured to contain a battery, or portions of a battery. For example, the battery housing portion can be configured to receive a packaged battery 30, such as an OEM battery, including its external housing 32, similar to the device housing 12 shown in FIG. 1. As such, a discrete battery can be contained within battery housing portion.

In some embodiments, the device housing 112 can form an integrated battery housing 114, to receive an integrated battery. For example, the interior battery cavity 116 can be configured to receive the internals of a battery, such as one or more battery electrodes, battery cell terminals and other electrical connections, electrolyte, etc. (not shown), but without requiring the entire external battery housing 32 and the entire external housing 12 of the hybrid device 10 (FIG. 1). For example, interior battery cavity 116 can be formed from a portion of sidewalls 111A-111C, a portion of a base 115, a battery lid 133, and an inner sidewall 17 extending between 111B and 111D.

In some embodiments, the interior cavity 116 can be separated into a plurality of sub-cavities 116A, through a series of partitions 119 within the battery housing portion 114. Each sub-cavity 116A can house a battery electrode, to form one or more individual battery cells within cavity 116. Each battery cell can include a positive and negative battery cell terminal (not shown). These battery cell terminals can be electrically connected together in a manner similar to a known, discrete OEM battery, and placed in electrical communication with internal battery terminals 41 and 42 extending through the lid 133. The "internal battery terminals" can be defined as the external terminals for a discrete battery placed within the energy storage device housing, or the battery terminals of an integrated battery formed within the integrated battery housing, as described further herein.

Embodiments of device 100 with the integrated battery housing 114 shown in FIG. 2A may eliminate the need for one or more sidewalls 31 and base 35 of the battery housing 32 shown in FIG. 1. As such, device 100 can allow battery 130 to be integrated directly within the device housing 112 of hybrid energy storage device 100, without requiring an entire, additional, separate external battery housing. Referring again to FIG. 2A, in some embodiments, all or a portion of the integrated device housing 112 of device 100 can comprise an integrally-formed, unitary component. In some embodiments, the sidewalls 111A-111D, base 115 and inner sidewall 117 can be an integrally formed unitary component, for example, through a molding or other suitable process.

The device housing 112 can be divided into a capacitor housing portion 124 with an interior capacitor cavity 126 configured to contain capacitors 120A-120F. The capacitor housing portion 124 can be positioned horizontally adjacent to the battery housing portion 114. In use, the internal battery components can be loaded into the interior cavity 116 of battery housing portion 114 and connected to the aforementioned battery cell terminals, which can be connected to form the internal battery terminals, and covered or sealed with battery lid 133. The capacitor housing portion 124 can be loaded with the capacitors 120-120F, and electrical connections made between the capacitors 120A-120F and battery 130, as described further below. The device housing 112 can be closed or sealed with the device cover 113. In some embodiments, the battery lid 133 can be omitted, and the device cover 113 can be used to cover both the battery housing portion 114 and the capacitor housing portion 124.

The capacitor cavity 126 can be formed from a portion of the three sidewalls 111A, 111B, and 111D, a portion of the base 115, inner sidewall 117, and the lid 113. As such, sidewalls 111A, 111B, and 111D, base 115, and inner sidewall 117 can form both a part of the battery housing portion 114 and the capacitor housing portion 124. As such, capacitor housing portion 124 and the battery housing portion 114 can share one or more common walls. In some embodiments, the inner sidewall 117 can be positioned between the capacitor 120 and the inner components of battery 130, without additional intervening walls. In some embodiments, the battery 130 can be formed within portions of the one or more of the sidewalls 111 and/or base 115, without intervening structure between these and the internal battery components.

Embodiments of device housing 112 that include one or more of these common walls forming both battery housing portion 114 and capacitor housing portion 124, without additional intervening, redundant walls, can decrease the overall space envelope of the device 100. Additionally, the battery and/or capacitor charge capacity for device 100 can be increased, and the heat transfer and thermal dissipation from the battery 130 within device 100 can be increased, for a given space envelope. Such benefits can be beneficial, for example, when hybrid device 100 is configured to fit within the predetermined space envelope of a standard OEM battery.

The capacitor housing portion 124 of the device 100 can be sized and shaped to house capacitors of various quantities, sizes, shapes and/or orientations, and may be sized and shaped to house capacitors of more than one size, or shape, or orientation. For example, the capacitor housing portion 124 may be expandable, and/or may be sized to include extra room to allow for expansion of capacitor capacity. The housing portion 124 shown in FIG. 2A can be configured to extend horizontally or vertically with respect to the view shown, or tangentially (into/out of the plane of the view shown). Additionally, although the capacitors 120A-120F are shown in an approximately horizontal orientation in FIG. 2A, the EDLCs can be oriented vertically, horizontally, tangentially, in one or more rows or columns, or combinations thereof.

Figure 3:
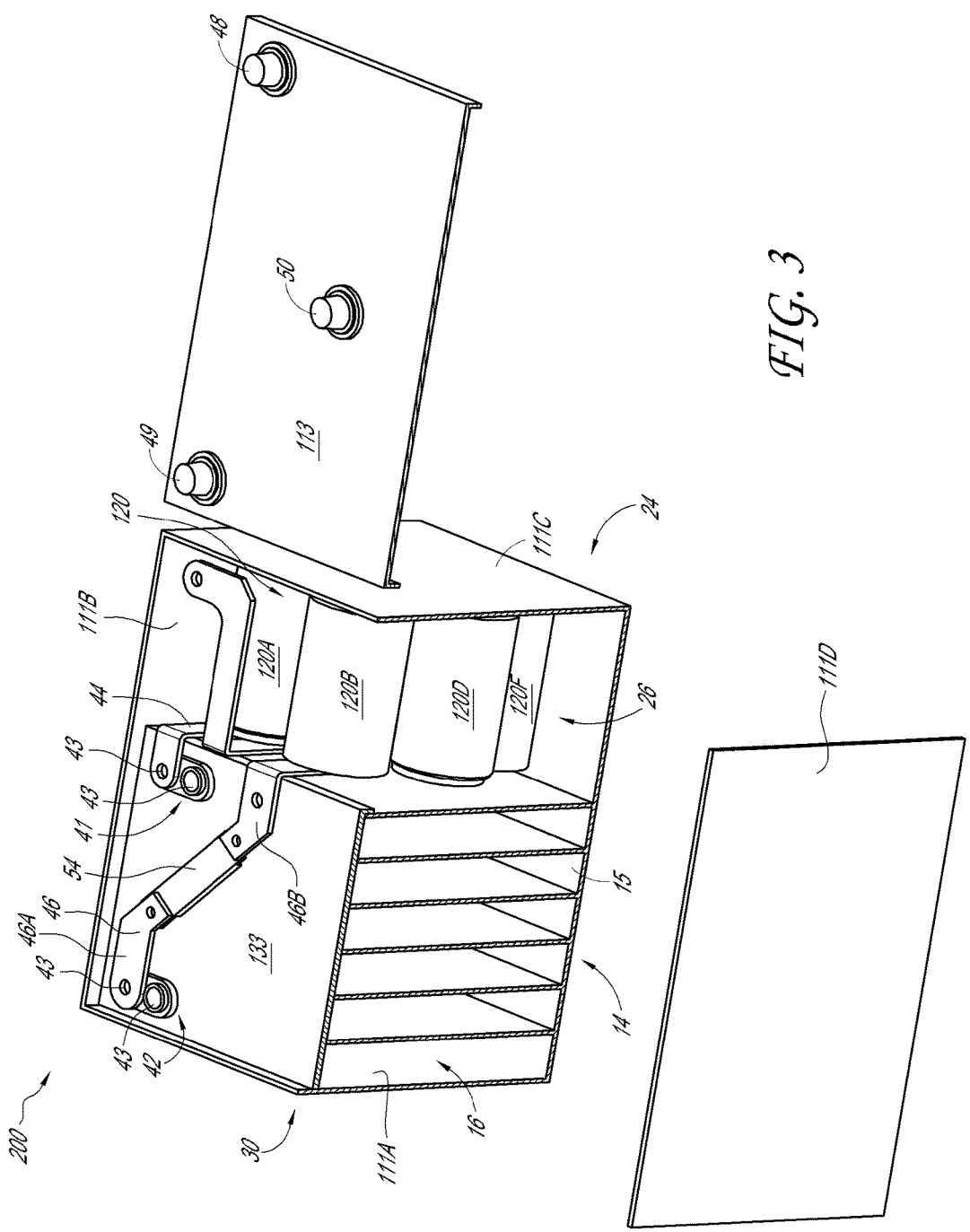
FIG. 3 is a front perspective cross-sectional cutaway view of an embodiment of a three-terminal capacitor/battery combination energy storage device.

FIG. 3 is a front perspective cross-sectional cutaway view of a three-terminal embodiment of an integrated capacitor/battery device 200. Device 200 can be similar to device 100 shown in FIG. 3, but with a third device terminal 50 to provide additional functionality. Further details regarding the functionality of device 200, and the wiring, terminal and bus bar configurations shown in FIGS. 2 and 3A are provided below.

EDLC pack on top of the battery

Figure 4:
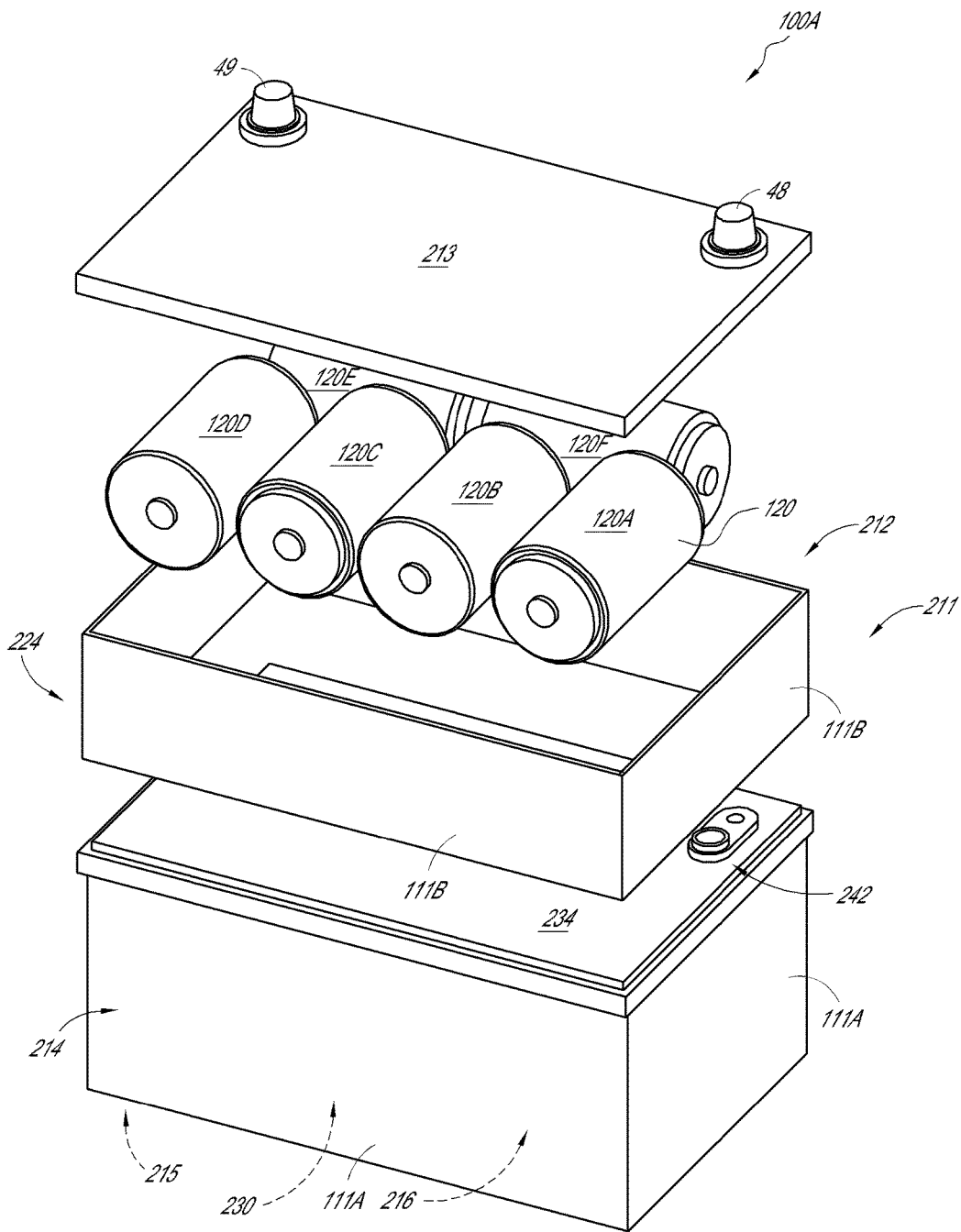
FIG. 4 is a front perspective exploded view of an embodiment of a capacitor/battery combination energy storage device.
Figure 5:
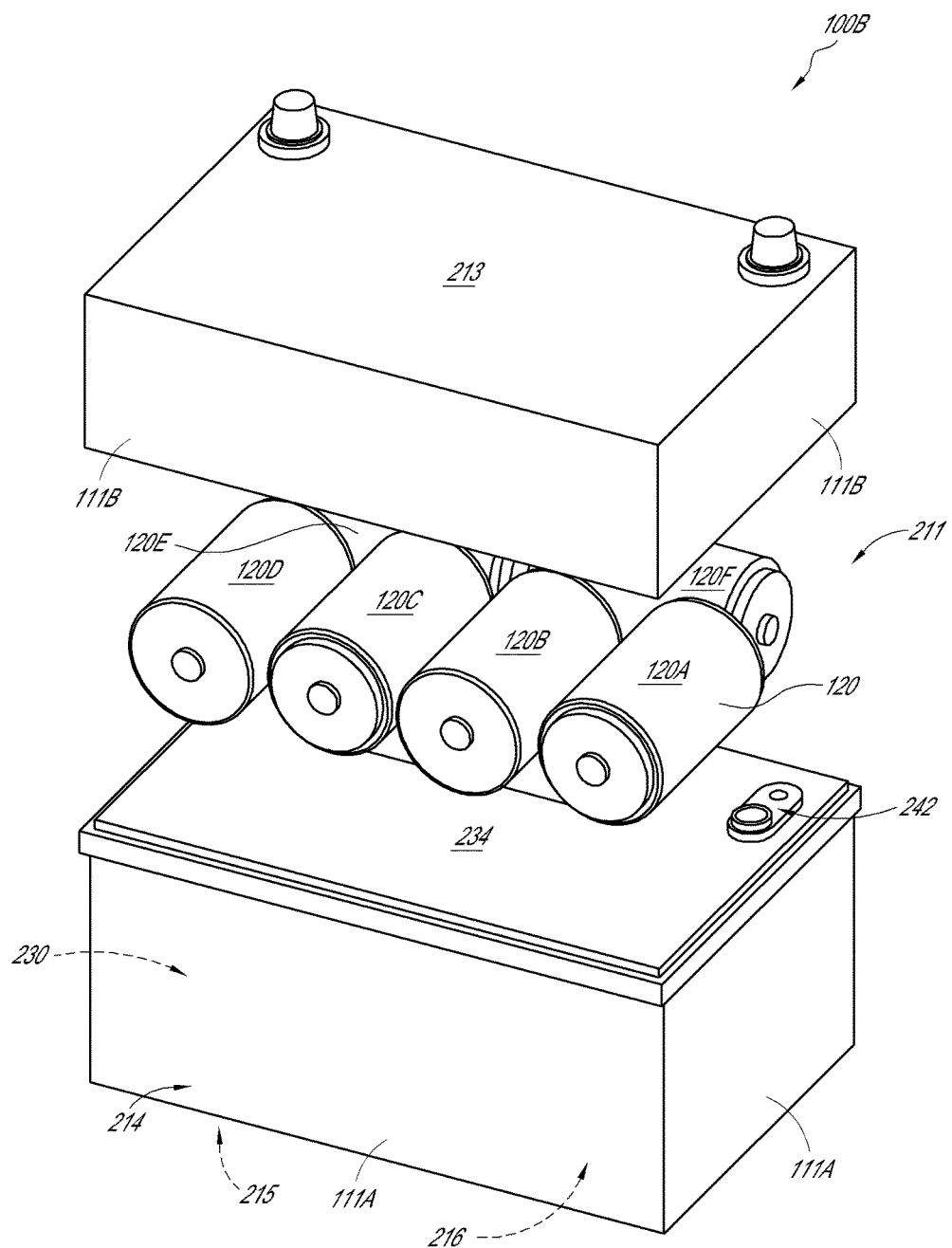
FIG. 5 is a front perspective exploded view of another embodiment of a capacitor/battery combination energy storage device.

FIGS. 4 and 5 are front perspective exploded views of embodiments of a combination capacitor/battery device 100A, 100B, respectively. The embodiments shown in FIGS. 4 and 5 can be similar to those in FIGS. 2A-3, with one or more of the following differences.

In the embodiments shown in FIGS. 4 and 5, the a battery housing portion 214 can be configured to be vertically adjacent to (either above or below) a capacitor housing portion 224. For illustrative purposes, the battery housing portion 214 is positioned below the capacitor housing portion 224, such that the battery 230 can be positioned below the capacitor 220. A lid 213 can be configured to cover and/or seal the capacitor housing portion 224, to enclose the capacitor 20 therein.

A separator lid 234 can be positioned between the battery housing portion 214 and the capacitor housing portion 224. The separator lid 234 can be configured to provide a dual function of both the battery lid 133 and inner sidewall 117 described above (FIGS. 2A-3). For example, the separator lid 234 can be configured to both cover the inner cavity 216 of battery housing portion 214, and to separate the battery housing portion 214 from capacitor housing portion 224. Separator lid 234 can at least partially seal the battery housing portion 214. For example, the separator lid 234 may sufficiently seal the battery internals within battery housing portion 214 to prevent or reduce leakage, while still allowing partial venting therefrom. The separator lid 234 can be removable or permanently attached to the battery housing portion while providing such sealing function. Such embodiments can reduce the need for both the battery lid 133, and the sidewall 117 between the battery housing portion 14 and capacitor housing portion 124 (FIGS. 2A-3). By integrating the functionality of a battery lid and a separator between battery and capacitor compartments 214, 224, respectively, embodiments of devices 100A, 100B that include the separator lid 234 can further increase battery and/or capacitor charge capacity, and improve heat transfer and thermal dissipation from the battery, for a given space envelope.

Continuing to refer to FIGS. 4 and 5, the sidewalls 211 of device housing 212 may include battery portion sidewalls 111A that form a portion of battery housing portion 214, and capacitor portion sidewalls 111B that form a portion of capacitor housing portion 224. The sidewalls 111A, 111B can be configured in a number of different ways. For example, the sidewalls 111B can be attached to and extend upwardly from separator lid 234. In some embodiments, sidewalls 111A can extend upwardly from the sidewalls 111B, with the separator lid 234 configured to be inserted within a perimeter formed within sidewalls 111B. In some embodiments, sidewalls 111B can extend downwardly from the lid 213 to form the capacitor housing portion 224 and enclose the capacitor 120. The sidewalls 111B can be configured as a separate section that can form the capacitor housing portion 224, with lid 213 being a separate component. Thus, the device housing and its various portions described herein can be separately or integrally formed in a variety of methods.

The embodiment shown in FIGS. 4 and 5 may have improved weight distribution for handling etc., as the battery, which can generally be denser, and thus, heavier than the EDLC, is distributed approximately evenly across the width of the overall device 10. In some embodiments, the battery is positioned below the capacitor, to prevent toppling of the device, which further improves weight distribution and handling.

In an embodiment of the combined battery/capacitor storage device shown in FIGS. 4 and 5, a Group 75/25 Battery (12V) with dimensions of 9.3 inch (L)×6.8 inch (W)×7.0 inch (H) can be employed. The integrated battery can be configured to occupy approximately the lower ⅔ of the container. In this embodiment, the capacitors can occupy an estimated remaining 9.0 inch (L)×6.5 inch (W)×2.3 (H) inch of volume within the capacitor housing portion. It will be understood that this embodiment is not to be limited to a Group 75/25 Battery, or the voltages and dimensions described, and is merely for illustrative purposes.

Terminals/Bus Bars

Figure 6A:
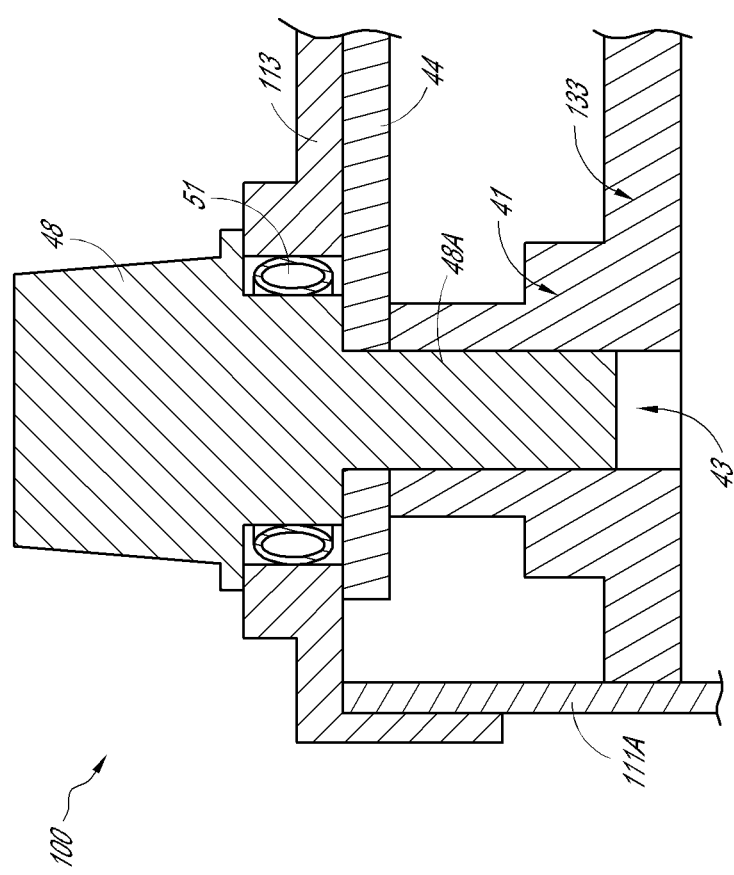
FIG. 6A is a side cross-sectional view of an embodiment of a terminal and bus-bar that can be implemented within a capacitor/battery combination energy storage device.
Figure 6B:
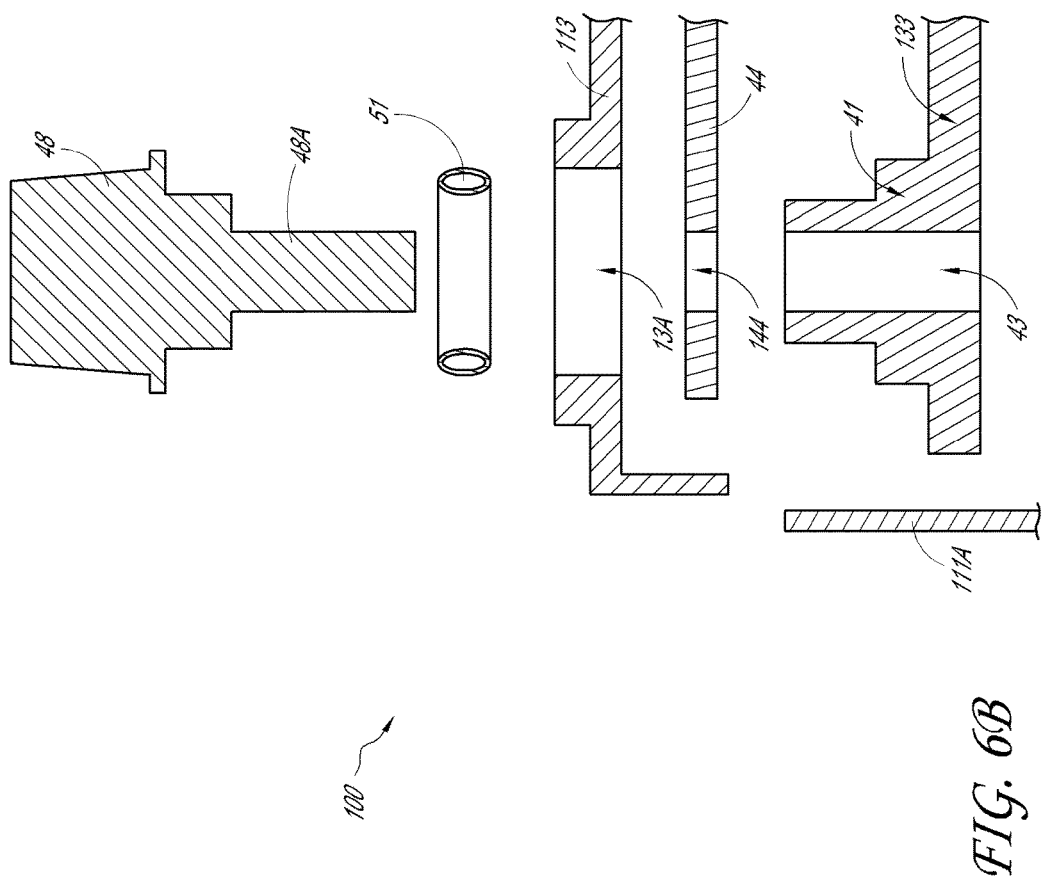
FIG. 6B is an exploded side cross-sectional view of the terminal and bus-bar embodiment shown in FIG. 6A.

FIGS. 6A and 6B are a side cross-sectional and an exploded side cross-sectional view, respectively, illustrating embodiments of electrical connections, terminal and bus-bar configurations that can be implemented within a combined batter/capacitor storage device, such as those shown in FIGS. 2A and 3. FIG. 2B is a left perspective view of a capacitor bank that can be implemented within a capacitor/battery combination energy storage device, such as devices 100 and 200 from FIGS. 2A and 3.

For illustrative purposes, the embodiments of FIGS. 2A, 3, 6A and 6B are shown in the context of a side-by-side or horizontally adjacent combined battery/capacitor device. However, it will be understood that similar features can be employed for the terminal and bus-bar configuration of an over-under or vertically adjacent combined battery/capacitor device, such as those described herein and shown in FIGS. 4 and 5. Additionally, the embodiments shown can be employed for the bus-bar configuration of an energy storage device with an integrated battery or a discrete battery.

Referring to FIGS. 2A and 2B, capacitors 120A-120F can each include capacitor terminals 123A and 123B, which can be connected in series or parallel with respect to each other to form capacitor bank 120. The terminals 123A and 123B can be connected with a plurality of capacitor interconnects, bus bars, etc. In the illustrated embodiment, capacitor interconnects 121A-121E extend between and electrically connect the terminals 123A, 123B of adjacent capacitors in bank 120. For example, the interconnect 121A (FIG. 2A) can connect a terminal 123A of capacitor 120A with a terminal 123B of capacitor 120C, and so forth. In the illustrated embodiment, capacitors 120A-120F are connected in series with interconnects 121A-121E, such that terminal 123B of capacitor 120A forms a first capacitor bank terminal 125 and terminal 123A of capacitor 120B forms a second capacitor bank terminal 127.

Referring to FIGS. 2A and 2B, the combined battery/capacitor device 100 can be configured as a two-terminal device, comprising two internal battery terminals 41 and 42. The battery terminals 41, 42 can include one or more openings 43 extending through each terminal. The openings 43 can comprise a bushing or a threaded opening. In some embodiments, the battery terminals 41, 42 can be insert-molded into the battery lid 33. The internal battery components can include an internal terminal post configured to engage with the opening 43. The internal terminal post can comprise any suitable terminal material, such as lead. The internal terminal post can engage with the opening 43 in various ways, such as by induction welding. The internal threads on the battery terminals 41, 42 can be used to connect the battery to the capacitor bank 120, as well as an external terminal to the combined energy storage device, as described further below.

In the illustrated embodiment, the first battery terminal 41 can be connected with a first bus bar 44 to the first capacitor bank terminal 125 of the capacitor bank 120. The first bus bar 44 can be any of a number of shapes; in the illustrated embodiment, it comprises a downwardly extending portion 44A that extends along a side of battery 130 and connects the battery terminal 41 with the capacitor terminal 125 (FIG. 2B). An upwardly extending portion 44B can extend along the side of battery 130, with a laterally extending portion 44C extending from portion 44B to the first external device terminal 48. The first external device terminal 48 can extend from the first bus bar 44, to connect the device 100 to an external system at a first point, such as a connection to a vehicle's electrical system (see, e.g., FIGS. 3A; 6A-6B; 8-18).

Referring again to FIGS. 2A and 2B, the second battery terminal 42 can be connected with a second bus bar 46 to the second capacitor terminal 127 of the capacitor bank 120. A second external device terminal 49 can extend from the second bus bar 46, to connect the device 100 to an external system at a second point, such as a positive connection to a vehicle's electrical system (see, e.g., FIGS. 2A; 6A-6B; 8-18). External device terminals 48 and 49 can be attached to a portion of the lid 113 of the integrated storage device 100. External device terminals 48 and 49 can be configured to correspond to the existing dimensions of the terminals of a standard OEM battery. It will be understood that the external device terminals described herein can extend from the lid 113, sidewalls 111A-D, base 115, or other portions of energy storage device 100.

Referring to FIG. 3, the three-terminal embodiment of device 200 is similar to the two-terminal embodiment of device 100 shown in FIG. 2A, but with an additional external terminal 50 extending through the lid 113 from the second bus bar 46. Additional electronic components can be connected to one or more of the device terminals 48, 49 and 50, battery terminals 41 and 42, bus bars 44 and 46, capacitor terminals 45 and 47, or elsewhere within device 200, for additional functionality. For example, FIG. 3 shows electronic components 54 that can be positioned between portions 46A and 46B of bus bar 46. Embodiments of hybrid battery/capacitor energy storage devices with additional electronic componentry and functionality are described below with reference to FIGS. 8-18.

Connection between the terminal bus bars and the external device terminals

FIGS. 6A and 6B show an embodiment of device 100 with details of the connection between external device terminal 48, battery lid 133, device lid 113, bus bar 44, and battery terminal 41. Similar methods can be employed to connect the other external device terminals, bus bars, battery terminals, and capacitor terminals to the battery and device lids described herein, such as the others described with references to devices 100 and 200. As shown, the external terminal 48 can extend through the device housing lid 113, through the terminal bus bar 44, and to the external battery terminal 41.

Referring to FIG. 6B, in some embodiments, a protruding stud 48A of terminal 48 can be extended through an opening 13A in device lid 113. In some embodiments, the same portion of the terminal stud 48A can be further extended into an opening 144 in the terminal bus bar 44. In some embodiments, the same portion of the terminal stud 48A can be further extended through the opening 144 in the terminal bus bar 44, and into a mating portion 43 on the battery terminal. The portion of the terminal stud 48A can engage with one or more of the aforementioned openings, through a bushing or threaded connection. In some embodiments, the stud can engage with a corresponding portion on the capacitor terminal. Such embodiments can allow one or more external terminals of a combined battery/capacitor energy storage device to function as a consolidated electrical and mechanical junction between the external terminal, bus bar and internal battery terminal, thereby reducing complexity of the energy storage device.

Thus, some embodiments can allow the battery terminals 41, 42 of energy storage device 10 to be aligned with the external device terminals 48, 49 or 50, and the external device terminals 48, 49 or 50 can be installed from outside the energy storage device lid 113, while also connecting to the bus bars 44, 46 and the internal battery or internal capacitor terminals.

In embodiments where such alignment between the battery terminals 41, 42 and/or capacitor terminals 45, 47 and the external device terminals 48, 49 or 50 is not desirable, the external device terminals 48, 49 or 50 can be installed through the device lid 113, and connected to one of the bus bars 44, 46, without connecting directly to the capacitor battery terminals 41, 42 or capacitor terminals 45, 47.

The terminal bus bars 44 and 46 can be routed in a number of different ways. In both the embodiments shown in FIGS. 2A and 3, the terminal bus bars are routed in the space between the battery lid 133 and the device lid 113 (see also FIGS. 2A-2B).

Referring again to FIGS. 6A and 6B, in some embodiments, the external device terminals 48, 49 or 50 can include a seal 51 configured to provide a seal against the housing lid. Additionally, to prevent galvanic corrosion at the joints between lead battery terminal or lead device external terminal and aluminum EDLC bus bars, a tin plating can be used on the aluminum bus bar, or grease that has been made for electrical joint application can be used. The aforementioned structure and methods can provide for efficient assembly of the terminals and bus bars of embodiments of the combined battery/capacitor device described herein, with reduced number of linkages and parts.

Figure 7:
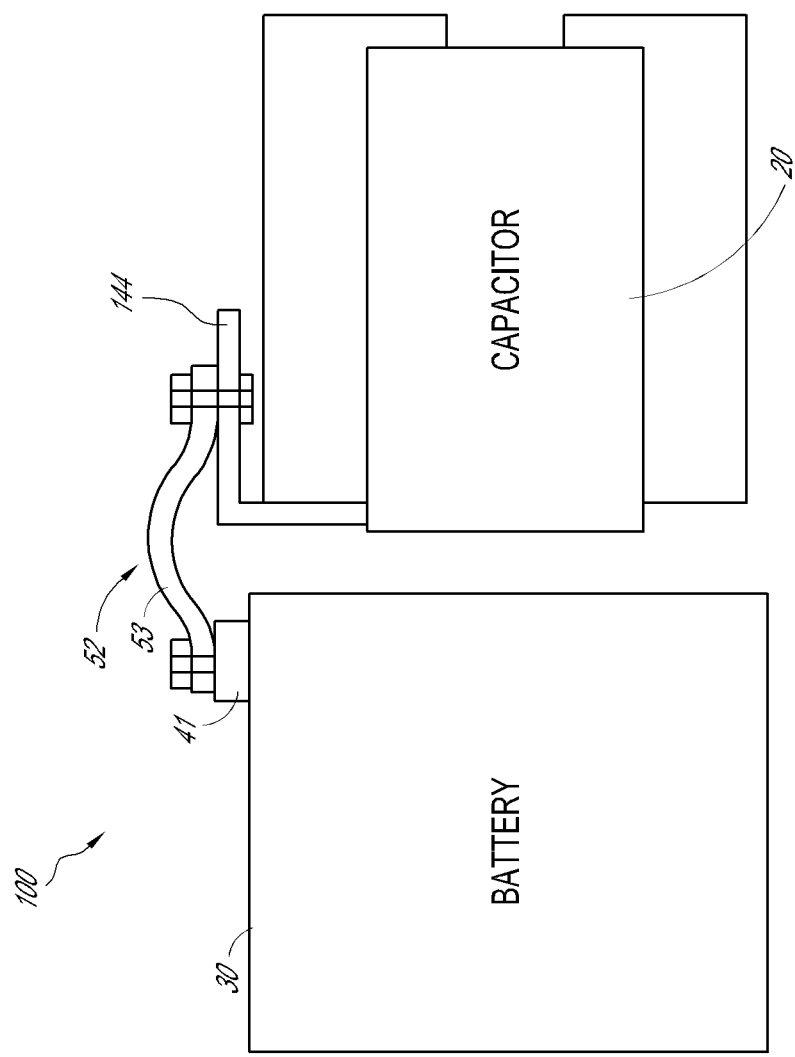
FIG. 7 is a side view of an embodiment of a capacitor/battery combination energy storage device with a flexible bus bar.

FIG. 7 is a side view of an embodiment of combined battery/capacitor device 100 with a flexible bus bar 52 connected between battery terminal 41 and a capacitor terminal bus bar 144. The flexible bus bar 52 can provide sufficient flexibility to compensate for some relative movement between capacitor 20 and battery 30. Such relative movement may be more prevalent when battery 30 and capacitor 20 are packaged together in a combined battery/capacitor device 10. The flexibility of flexible bus bar 52 can prevent wear and premature failure on bus bar 52, thus increasing the reliability and life of energy storage device 10. The flexibility can be provided to bus bar 52 through its structural attributes and/or material. For example, the flexible bus bar 52 can comprise a material, such as copper bead, stranded wire, or braided wire, that is suitably flexible under a range of reasonable dimensions and environmental conditions for a bus bar as would be understood by a person having ordinary skill in the art. In some embodiments, a flat, braided electrical cable can be used. The ends of the electrical cable can be tinned and hole-punched to form an integrated lug. In some embodiments, bus bar 52 can include one or more curvilinear portions 53 that allow flexion of bus bar 52, and relative movement between battery 30 and capacitor 20.

FIGS. 8-18 are schematic diagrams showing various embodiments of electrical features that can be implemented within a capacitor/battery combination energy storage device, such as one or more of the devices 10, 100, 100A, 100B and 200, described above with reference to FIGS. 1-7. For example, the electrical features may comprise control or regulation circuitry disposed in the enclosure and coupled to the battery and ultracapacitor.

General Two-terminal Devices

Figure 8:
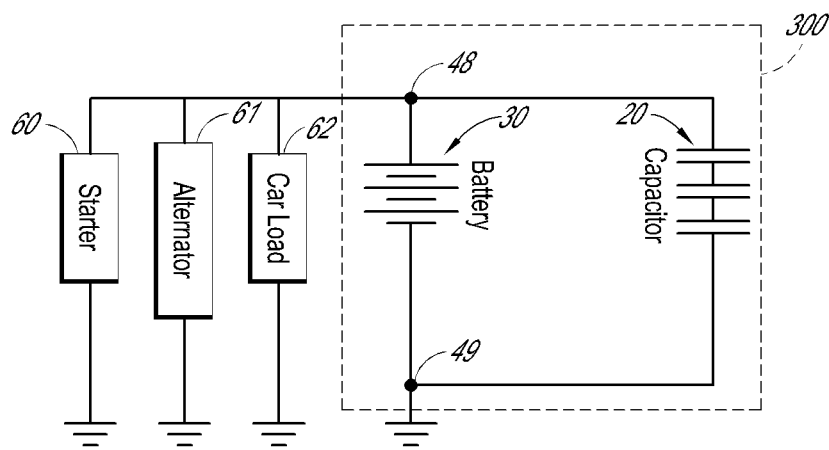
FIG. 8 is a schematic diagram illustrating an embodiment of a capacitor/battery combination energy storage device with two external terminals.

FIG. 8 is a schematic diagram illustrating an embodiment of a capacitor/battery combination device 300 with two external terminals 48 and 49. The electronics schematically shown for the capacitor/battery combination device 300 can be implemented within the other two-terminal capacitor/battery combination devices described herein. Terminal 48 can be a positive terminal and terminal 49 can be a negative or ground terminal. One or more devices can be connected in parallel between terminals 48 and 49. For example, in the illustrated embodiment, capacitor 30 and battery 20 can be connected in parallel between terminals 48 and 49. When placed within a vehicle, the combined energy storage device 300 can be electrically connected to one or more vehicle loads. For example, the combined device 300 can be connected to a starter 60 or other vehicle loads (illustrated as car load 62). The combined device 300 can also be connected to a power supply, such as an alternator 61, in order to charge the combined device 300 as the vehicle is being driven. Other power supplies can be implemented instead of or in addition to alternator 61, for any of the embodiments described herein and shown in the figures, unless otherwise specified. For example, another external power supply may be connected to device 300 to charge battery 20, such as a charging station for an electric or hybrid vehicle. The order and positioning of the car load 62, alternator 61, and starter 60 can be varied, and is provided in the order shown in FIG. 8 relative to the combined energy storage device 300 for illustrative purposes only.

Embodiments of the device 300 in FIG. 8 can allow both the capacitor 30 and the battery 20 to be charged from a power supply, such as the alternator 61, and also supply power to a vehicle system, such as the starter 60 or other car loads 62. In a typical vehicle application, both the battery 20 and the capacitor 30 are charged from the alternator 61 with a charge voltage ranging from approximately 12-16V, with a typical average charge voltage being about 14.4V. Prior to being disconnected from the alternator 61, the battery generally maintains a reasonably high state of charge.

However, after the alternator 61 is shut off or removed as a charging source, the state of charge of the battery 30 may drop at the point the alternator 61 is turned off. For example, if the battery 30 is older, in a colder climate, or has been significantly discharged (such as in a start/stop application) without fully recharging prior to the alternator 61 being shut off, it is not uncommon for the capacity of battery 30 to drop to a point ranging from 65-85% of its rated capacity. As is known, a battery capacity is measured in amp hours with a typical battery having a capacity of 60 amp-hours, although many batteries have more or less capacity depending on their cost and application. It is also not uncommon for the voltage of a battery to drop to approximately 12.4V when the alternator 61 is shut off. When a battery is nearing its end of life cycle, the charge may even decrease to 11.5V or less. In some cases, a battery voltage may drop to as low as 7V after the alternator 61 is shut off. These large voltage drops in the battery 30 can reduce the battery's life, prevent or reduce the likelihood of a reliable starter crank, or cause other problems described herein with respect to a low battery voltage.

Providing the capacitor 20 in parallel with the battery 30, as shown in FIG. 8, has been found to buffer these and one or more other aforementioned limitations of a battery-only system. For example, one embodiment of the invention is a combined battery/capacitor system that allows a bi-directional flow between the capacitor 20 and battery 30. This provides a system wherein the capacitor 20 is configured to recharge the battery 30 when the state of charge and voltage in the capacitor 20 is higher than the battery 30. The increased cycle efficiency of the capacitor 20 can also allow the capacitor 20 to provide such function while increasing the life of the battery 30, and thus the overall lifecycle of the device 10. In effect, the capacitor 20 can absorb the "work" or power requirements that would otherwise be performed by the battery 30. In addition, the efficient charge acceptance and discharge rate of the capacitor 20, and its cycle efficiency, can allow it to mitigate some of the spikes and drops in power typical during operation of the device, such as in a start/stop application. The two-terminal combined energy storage device 300 in FIG. 8 can also be more easily configured to replace a standard two-terminal OEM battery, for example, as a drop-in replacement.

The power management characteristics of embodiments of the two-terminal combined battery/capacitor energy storage device 300 can be affected when the battery 30 and capacitor 20 are configured in parallel, and when free-flow of current is allowed between the battery 30, capacitor 20, and starter 60. For example, any current supplied to the vehicle starter 60 from the combined storage device 300 during a vehicle start event will be generated proportionally from both the battery 30 and the capacitor 20, and will be affected by the resistance of the battery 30, the ESR of the capacitor 20, and the capacitance of the capacitor 20. For example, in a test of such a configuration, during a typical vehicle starting event, the battery 30 supplied approximately 200 A of current and the ultracapacitor contributed approximately 600 A of current.

Additionally, because current can free flow between the capacitor 20 and the battery 30, the available charge and voltage of the capacitor 20 will also generally move towards a charge and voltage equilibrium relative to that of the battery 30 when the alternator 61 or other power source is in an off state. Such voltage equilibrium may generally be less than the state of charge and voltage of the capacitor 20 if it were to be electrically isolated from the battery 30. For example, as described above, when the combined device is at rest for a period of time, or when the battery 30 is not fully recharged, the battery voltage and state of charge may drop. Thus, there may be advantages to embodiments of a combined battery/capacitor storage device that at least partially electrically isolates the battery and capacitor, to reduce or prevent the capacitor from losing charge to the battery when the alternator is off.

Three-terminal Current Controlling Devices

Figure 9:
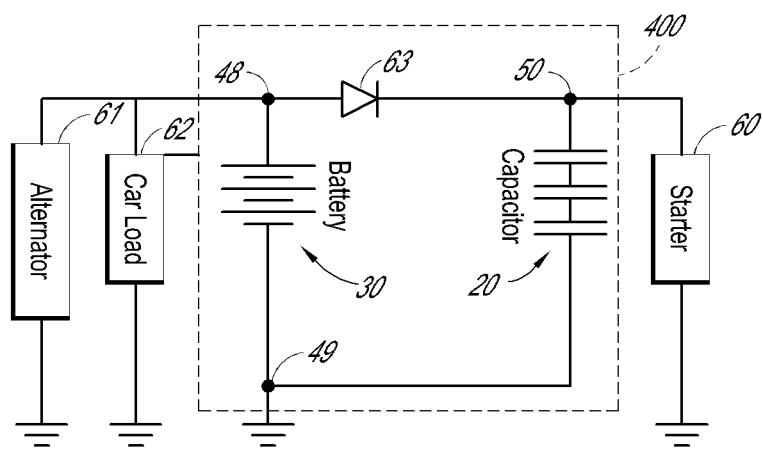
FIG. 9 is a schematic diagram illustrating an embodiment of a capacitor/battery combination energy storage device with three external terminals and a rectifier.

FIG. 9 shows an embodiment of a combined battery/capacitor energy storage device 400, with many similar components as FIG. 8. A difference is that the embodiment of energy storage device 400 in FIG. 9 can include a third terminal 50, such as that shown in FIG. 3. The electronics schematically shown for the capacitor/battery combination device 400 can be implemented within the other three-terminal capacitor/battery combination devices described herein. Terminal 48 can comprise a first positive terminal configured to connect with the alternator 61. Terminal 50 can comprise a second positive terminal that is configured to connect with starter 60. Such an embodiment can allow the starter 60 to be electrically configured on the same terminal of the device 300 as, for example, the capacitor 20, and the alternator 61 to be electrically configured on the same terminal as the battery 30. Of course, embodiments are not limited to only connecting a starter 60 to the first positive terminal. Terminals 48 and/or 50 can be configured to connect with other car loads 62 that would benefit from being directly connected to a capacitor or a battery.

A rectifier 63 can be positioned between the alternator terminal 48 and the starter terminal 50. The rectifier 63 can be configured to allow current flow from the alternator 61 to the capacitor 20, allowing the capacitor 20 to be charged, while preventing or reducing current flow from the capacitor 20 to terminal 48 and battery 30. Such an embodiment can at least partially electrically isolate the capacitor 20 from the battery 30. Thus, some such embodiments also isolate the starter 60 from the battery 30. Rectifier 63, or any other rectifiers described herein, can comprise a diode, a synchronous rectifier, a transistor, such as a controllable FET, or other suitable device to provide such function.

Embodiments that position the starter 60 on the same terminal as the capacitor 20, and isolate the capacitor from the battery 30 (by allowing only unidirectional current flow therebetween), can provide several benefits. For example, such embodiments can allow substantially only the power and current stored in the capacitor 20 to be provided to the starter 60 during a start event, reducing or eliminating the aforementioned affects of the battery resistance that may occur. Such isolation of functionality between the capacitor 20 and battery 30 can allow the capacitor 20 to supply power to quick or high power pulse devices, such as the starter 60, and allow the battery 30 to contribute power to devices with medium or longer period demands. Such embodiments can also prevent the state of charge and voltage of capacitor 20 from being reduced by the aforementioned lower voltage of the battery 30, or from reaching a combined battery/capacitor equilibrium state of voltage. As described above, the battery 30 may have an undesired, lower voltage because the battery has been accidently discharged, insufficiently recharged (for example, in a start/stop application), or is operating in a cold environment. The battery may have otherwise reached a lower state of charge due to lower charge acceptance. By at least partially isolating the battery 30 and capacitor 20 with the rectifier 63 in a three-terminal system, the capacitor 20 can remain at a higher voltage and state of charge when the alternator 61 or another power supply is turned off, separate from the state of charge, voltage and capacity of the battery 30. Such isolation thus can also provide an overall higher energy to the starter 60 from the capacitor 20, without the limiting effects of the battery 30.

The aforementioned isolation of the battery 30 from the capacitor 20 and starter 60 can also reduce the load on the battery 30 during engine crank, thus improving the life of the battery 30, for example, during start/stop applications. Thus, these embodiments can improve vehicle start efficiency, and reduce the likelihood of the situation where the system can't provide sufficient power to the starter 60 to start the vehicle. For example, in average conditions, the available discharge voltage at the starter terminal 50, and thus of the capacitor 20, after the alternator 61 was turned off was approximately 13.5V (the alternator voltage minus the voltage drop over the rectifier, or ~14.2−0.7=13.5V). In similar conditions, the discharge voltage at the alternator terminal 48, and thus, of the battery 30, dropped to approximately 12.6V after the alternator 61 was turned off.

The increase in voltage and state of charge provided by using the isolated capacitor 20 and starter 60 may further enhance vehicle startup at low temperatures. For example, a battery's voltage may drop significantly more at a low temperature under load than that of a capacitor, resulting in low cranking power and efficiency. For example, a battery charged at approximately 15.0 volts (at approximately −10 degrees F.) and discharged at approximately 500 amps results in a 2 second discharge voltage of approximately 9.5V. In comparison, a capacitor charged at approximately 15.0 volts (at approximately −10 degrees F.) and discharged at approximately 500 amps, results in a discharge voltage of approximately 13.5V. Thus, under these example conditions, a capacitor provides approximately 4 additional volts to a starter. Such higher capacitor voltage in turn results in higher starter cranking power and motor velocity on the next engine crank and faster starting; thus the above example of 4 volts additional cranking power can provide approximately 40% faster crank speed.

At lower temperatures, a capacitor can store additional energy, even with respect to another capacitor, further enhancing the benefits of isolating the capacitor during vehicle startup. For example, the stored energy of a capacitor is defined by the equation $E=\frac{1}{2} C*V^2$, where C is the capacitance and V is the voltage. Thus, for example, a 400 farad capacitor at −10° F. receiving a typical vehicle alternator 61 voltage supply of 15 volts (at that temperature) can store 45 kjoules of energy. This is significantly more energy than a similar 400 farad capacitor at 160° F. receiving a typical vehicle alternator 61 voltage supply of 13.4 volts (at that temperature), which can only store 36 kjoules of energy. Such increased energy corresponds to increased cranking power, and increased start reliability at cold temperatures.

Rectifier 63 can be any of a variety of sizes, depending on the application. In an example using a standard vehicle battery (approximately 12V), a 400 amp diode was employed. However, it is anticipated that diodes rated in a range from approximately 300 to 1000 amps may provide similar results.

Figure 10:
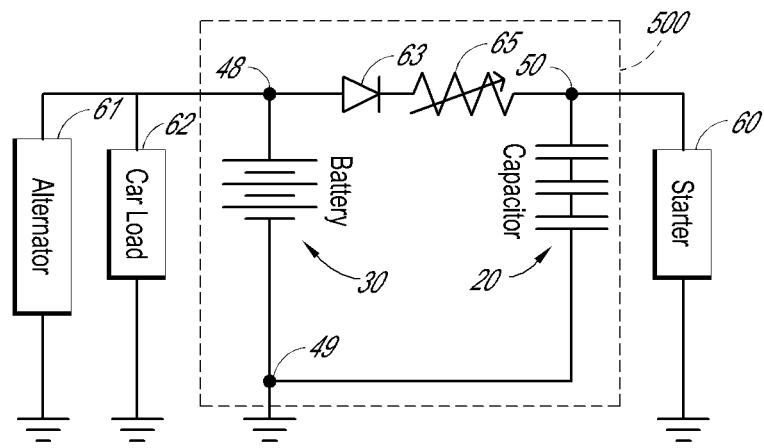
FIG. 10 is a schematic diagram illustrating an embodiment of the capacitor/battery combination energy storage device shown in FIG. 9, with a current limiter in series with the rectifier.

FIG. 10 shows another embodiment of a three-terminal combined battery/capacitor energy storage device 500, with many similar components as FIG. 9. The electronics schematically shown for the capacitor/battery combination device 500 can be implemented within the other three-terminal capacitor/battery combination devices described herein. In the illustrated embodiment, a current limiter 65 can be employed between the rectifier 63 and the starter terminal 50. Any suitable current-limiting devices can be employed, such as a positive-temperature coefficient (PTC) thermistor, a self-resetting circuit breaker, an in-rush limiting resistor with a bypass switch, and the like. The current limiter 65 can be employed to reduce the size of the rectifier 63, or for other reasons.

The current limiter 65 can be configured to open (and thus increase its resistance) when the current to which it is exposed is high. For example, such a high current situation may be typical of an engine start event, when the capacitor 20 is being used to crank the starter 60, as described above. When an increased a current is drawn from the battery 30, the battery's operational life can be reduced. The current limiter 65 prevents or reduces current draw from the battery 30 to the starter 60 during the starter 60 crank, increasing the life of battery 30. Additionally, by preventing or reducing the current draw from the alternator terminal 48 to the starter 60 through the rectifier 63, the current limiter 65 can also protect the rectifier 63 from increased current levels. Such current protection to the rectifier 63 can allow it to be sized smaller. For example, a system that employs a current limiter 65 may reduce the size of the rectifier 63 to those rated between approximately 25 to 400 amps. A smaller diode can allow the space envelope of device 10 to be smaller, or to be the same size, but with increased capacity of the battery and/or capacitor. A current limiter 65 can be implemented in series with the other rectifiers described in other embodiments herein, to provide similar functionality.

Figure 11:
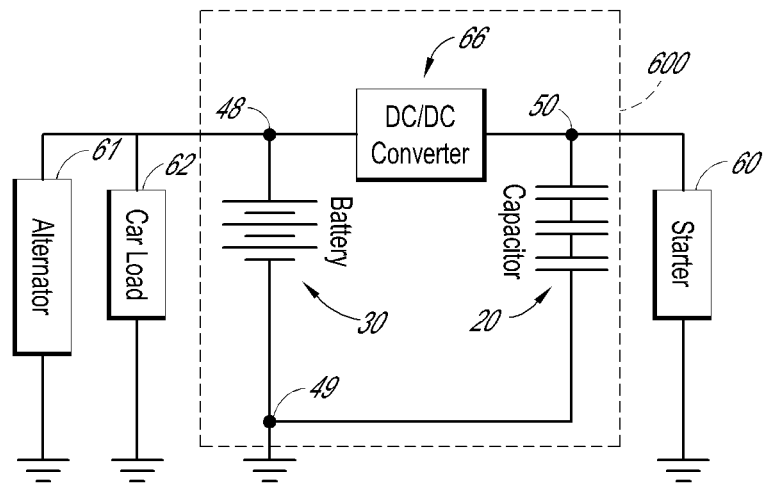
FIG. 11 is a schematic diagram illustrating another embodiment of a capacitor/battery combination energy storage device, with a DC/DC converter.

FIG. 11 shows another embodiment of a three-terminal combined battery/capacitor energy storage device 600, with many similar components as FIGS. 9-10. The electronics schematically shown for the capacitor/battery combination device 600 can be implemented within the other three-terminal capacitor/battery combination devices described herein. In this embodiment, a DC/DC converter 66 can be positioned between the alternator terminal 48 and the starter terminal 50. The DC/DC converter 66 can provide similar current management function as the aforementioned rectifier 63, FET 64, or rectifier 63 used in combination with a current limiter 65. The DC/DC converter 66 may also block the battery 30 from providing the entirety of the cranking current, and allow the capacitor 20 to be charged to a voltage greater than that of the battery 30. The DC/DC converter 66 may also charge the capacitor to different voltages depending on different environmental conditions; the capacitor may be charged to a higher voltage at lower temperatures, or lower voltage at higher temperatures. A DC/DC converter can control in-rush current to the battery, to reduce battery temperature increases. A DC/DC converter can also regulate the voltage of the capacitor to prevent an over-voltage condition.

Figure 12:
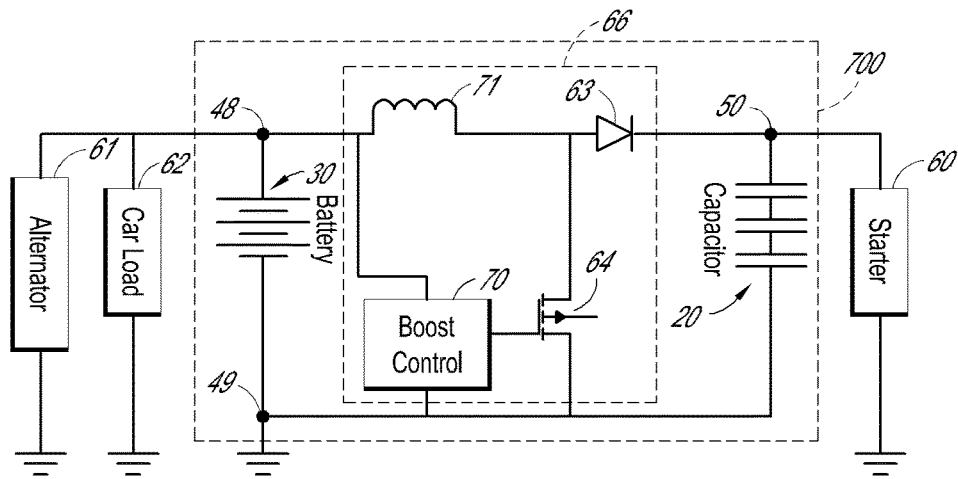
FIG. 12 is a schematic diagram illustrating another embodiment of a capacitor/battery combination energy storage device, with an embodiment of the DC/DC converter shown in FIG. 11.

FIG. 12 shows another embodiment of a three-terminal combined battery/capacitor energy storage device 700, with an embodiment of the DC/DC converter 64 shown in FIG. 11. The electronics schematically shown for the capacitor/battery combination device 700 can be implemented within the other three-terminal capacitor/battery combination devices described herein. In this embodiment, the DC/DC converter 64 includes a boost controller 70 configured to control an FET 64 positioned between the ground terminal 49 and the rectifier 63. It will be understood that other types of switching devices or transistors than FET 64 can be implemented. The FET 64 and boost controller 70 can provide charge to the capacitor 20 through the rectifier 63, to allow capacitor 20 to be charged to a voltage greater than battery 30, while isolating battery 30 from current during starter crank.

An inductor 71 can be positioned between the alternator terminal 48 and the rectifier 63, in parallel with the boost controller 70 and the FET 64. The inductor 71 can comprise a wire or bus bar with a saturable core surrounding it. Thus, inductor 71 can comprise a saturable inductor. The inductor 71 and the rectifier 63 can passively charge capacitor 20 to a voltage greater than battery 30, while isolating battery 30 from current during starter crank. For example, when the voltage of capacitor 20 is lower than battery 30 (e.g., after a start event), the capacitor 20 can be charged passively through inductor 71 and rectifier 63 up to the battery voltage. After an initial charge through inductor 71 and 63, the boost controller 70 can activate FET 64, allowing the capacitor 20 to actively charge, to a voltage greater than battery 30. By including both the passive and active charging, a smaller and less expensive controller 70 and FET 64 can be implemented, and the charge time to the capacitor 20 is reduced. Thus, the boost controller circuit shown in FIG. 12 can provide similar function as other DC/DC converters, but at lower complexity and cost.

Figure 13:
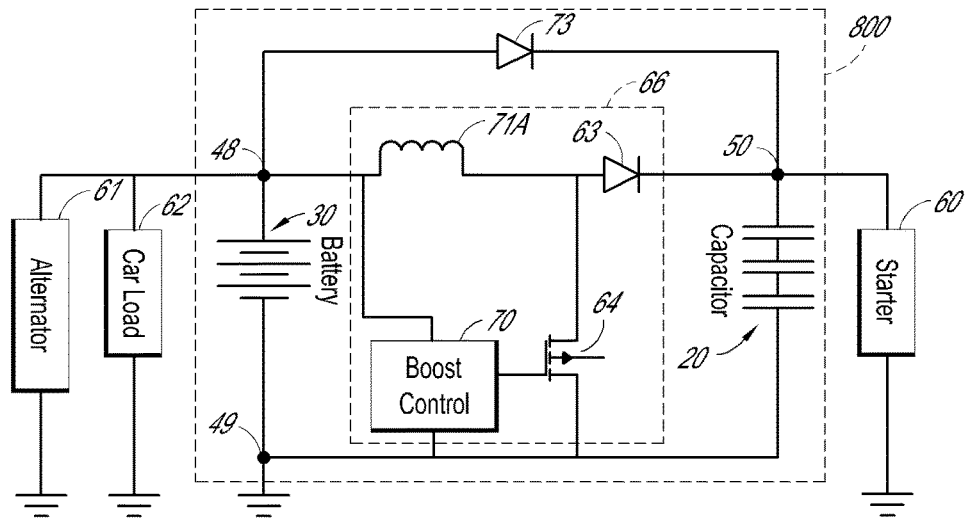
FIG. 13 is a schematic diagram illustrating another embodiment of the capacitor/battery combination energy storage device of FIG. 12, with the DC/DC converter in parallel with the main rectifier.
Figure 14A:
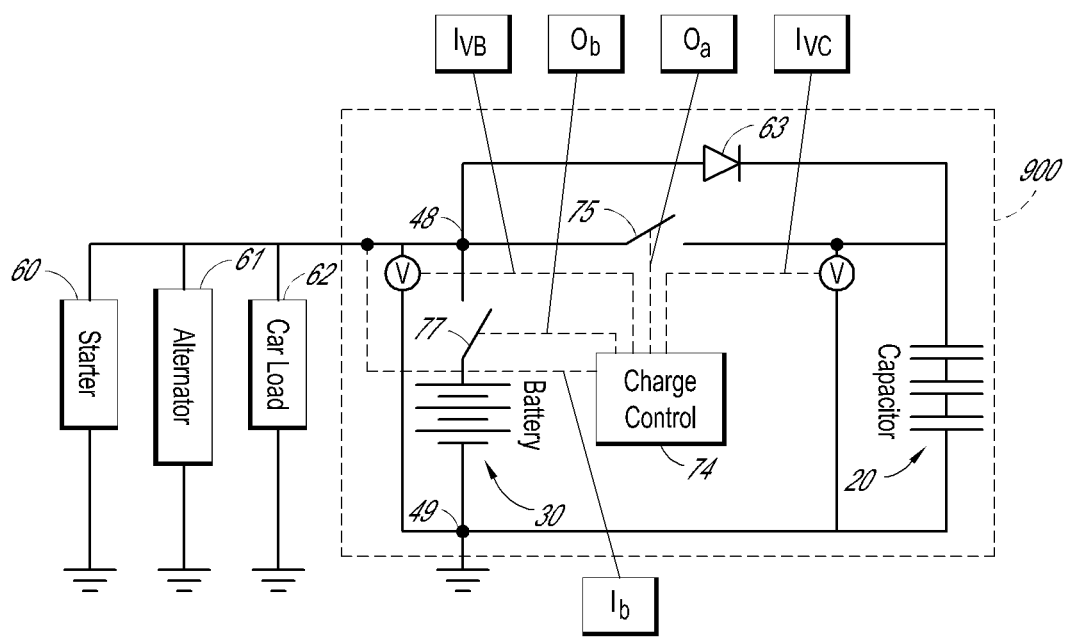
FIG. 14A is a schematic diagram illustrating an embodiment of a two-terminal capacitor/battery combination energy storage device with two switches.

FIG. 13 shows another embodiment of a three-terminal combined battery/capacitor energy storage device 800, with many similar components as FIG. 12. The electronics schematically shown for the capacitor/battery combination device 800 can be implemented within the other three-terminal capacitor/battery combination devices described herein. In this embodiment, a second rectifier 73 can be positioned between the alternator terminal 48 and the starter terminal 50, in parallel with the inductor 71A and rectifier 63. In some embodiments, inductor 71A is not saturable. The boost charger circuit shown in FIG. 13 can provide similar function as the circuit shown in FIG. 12. In this embodiment, the rectifier 73 can charge the capacitor to a voltage approximately equal to that of the battery. The boost charger can be turned on and raise the capacitor voltage to a set value above the battery voltage. The boost charger can include an inductor 71A (which is typically smaller than the inductor 71 of FIG. 12), the rectifier 63 (which is typically smaller than rectifier 73), FET 64 and boost controller 70. The boost charger can be of any suitable topology or implementation.
Two-terminal Devices-Switching FIG. 14A shows another embodiment of a two-terminal combined battery/capacitor energy storage device 900, with many similar components as FIGS. 9-13. The electronics schematically shown for the capacitor/battery combination device 900 can be implemented within the other two-terminal capacitor/battery combination devices described herein. In this embodiment, a first electronic switch 75 can be positioned to allow the capacitor 20 to be electrically connected to, and disconnected from, terminal 48, or its associated terminal bus. A second electronic switch 77 can be configured to allow the battery 30 to be electrically connected to and disconnected from terminal 48, or its associated terminal bus. The device 900 can include a rectifier 63. The rectifier 63 can be configured in parallel with switch 75 to allow the capacitor 20 to be charged while switch 75 is open, while preventing current flow in the opposite direction. For example, capacitor 20 can be passively charged through rectifier 63 from alternator 61, regardless of the positioning of switches 75 and 77. In some embodiments, a current limiter, such as a thermistor, may be included in series with the rectifier 63 to reduce the current load experienced by the rectifier 63 and the battery 30, as shown in FIG. 10.

The switches 75, 77 can be any of a number of suitable configurations, such as a semiconductor switch or a mechanical contactor. Suitable semiconductor switches include, for example, a various types of FETs or IGBTs. The switches 75, 77 can be configured to be operated manually or automatically. Of course, it should be realized that some embodiments may have combinations wherein the rectifier 63, or one or more of the electronic switches 75, 77 are not used. In some embodiments, an optional DC/DC converter, such as those shown in FIGS. 11-13, can be positioned between terminal 48 and capacitor 20.

Switches 75 and/or 77 can be electronically controlled with a charge controller 74. Any of a number of controllers described herein can be used to control switches 75 and/or 77; for example, the charge controller 74 can be a micro controller. Alternatively, the electronic switches 75 and/or 77 can be controlled by discreet logic. The charge controller 74 can be provided with one or more of the following inputs: voltage sense from the capacitor ($I_{vc}$), voltage sense from the battery ($I_{vb}$), and/or current sense ($I_b$) from the battery output. Other inputs, such as temperature sensors, may also be implemented to provide additional functionality. These inputs can be provided using any of a variety of sensors or other devices suitable of sensing an environmental condition and providing an input to the charge controller 74. The charge controller 74 can provide one or more of the following outputs: output to control switch 75 ($O_a$) and/or output to control switch 77 ($O_b$). It will be understood that one or more of the aforementioned switching, sensing, and controlling functionality can be provided through one or more separate or integrally formed components. For example, a voltage sensor and switch may be combined in a single unit, and/or the switch and microcontroller can be a suitable relay that switches directly in response to an input signal, for example, without complex electronics.

Figure 14B:
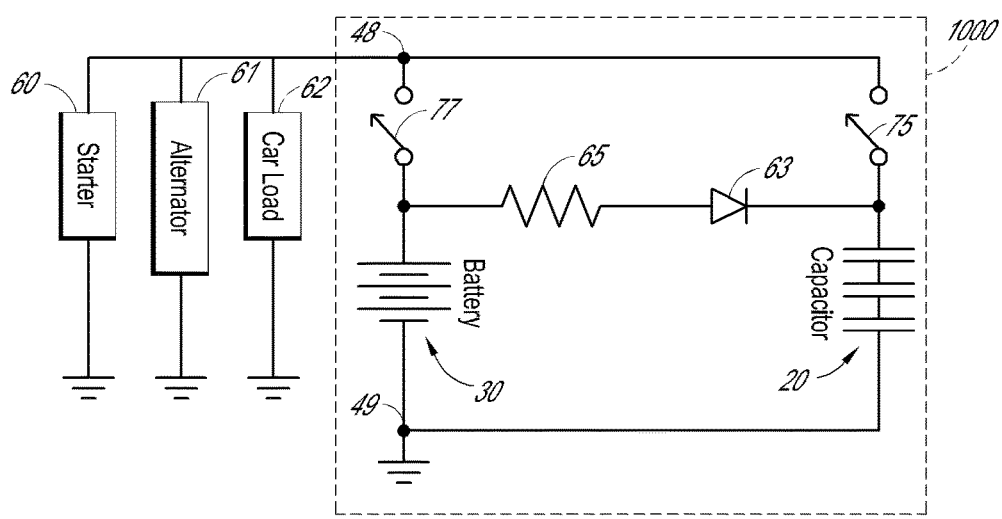
FIG. 14B is a schematic diagram illustrating another embodiment of a two-terminal capacitor/battery combination energy storage device with two switches.

FIG. 14B shows another embodiment of a two-terminal combined battery/capacitor energy storage device 1000, with many similar components as FIGS. 9-14A. The electronics schematically shown for the capacitor/battery combination device 500 can be implemented within the other two-terminal capacitor/battery combination devices described herein. The embodiment shown in FIG. 14B is similar to that in FIG. 14A, but with different positioning of the rectifier 63 relative to switches 75 and 77. In FIG. 14B, the rectifier 63 is connected to battery 30, without intervening switch 77. Thus, device 1000 in FIG. 14B can provide a path to the capacitor 20 from the battery 30, to passively charge the capacitor 20 through the rectifier 63 from battery 30, regardless of the open or closed status of switches 75 and 77. As shown in FIG. 14B, device 10 can include the current limiter 65 as shown. The functionality of the switches 75 and 77 in FIG. 14B can otherwise be similar to that described herein with reference to FIG. 14A or 15.

Three-terminal Devices-Switching

Figure 15:
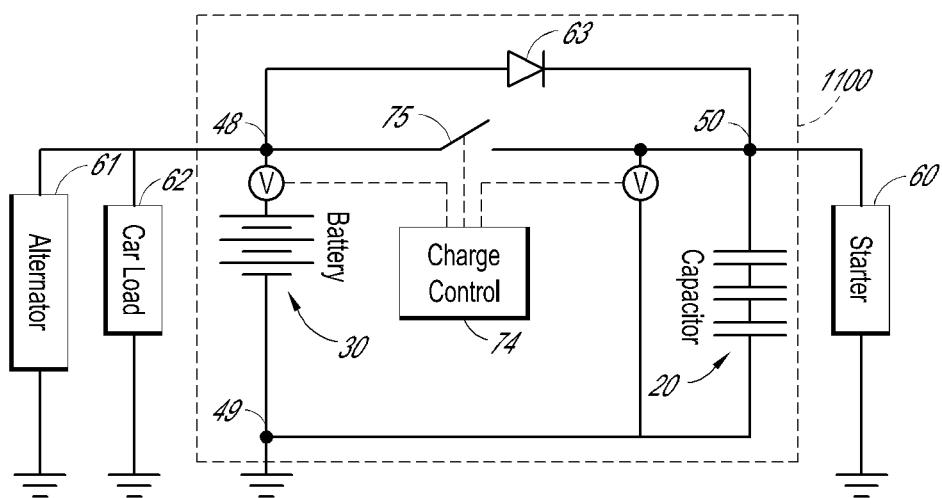
FIG. 15 is a schematic diagram illustrating an embodiment of a three-terminal capacitor/battery combination energy storage device with one switch.

FIG. 15 illustrates a substantially similar embodiment as FIG. 14A, but in a three-terminal combined battery/capacitor energy storage device 1110. The electronics schematically shown for the capacitor/battery combination device 1100 can be implemented within the other three-terminal capacitor/battery combination devices described herein. FIG. 15 does not include some of the components shown in FIG. 14A, such as all the inputs, outputs, and switch 77, but can be configured with these components, to provide similar functionality as the embodiments described herein with reference to FIG. 14A.

The switched configuration of the embodiments of the combined battery/capacitor energy storage devices shown and described with reference to FIGS. 14A-14B and 15 can be controlled in a number of different ways, to provide a number of different functions, examples of which follow:

Improved Start Function

The embodiments in this section can improve vehicle start efficiency, and reduce the likelihood of the situation where the battery 30 can't provide sufficient power to the starter 60 to start the vehicle. For example, the battery 30 may have an undesired, lower voltage because the battery 30 has been accidently discharged, insufficiently recharged, is operating in a cold environment, or the battery 30 has otherwise reached a lower state of charge due to lower charge acceptance or lower capacity. For example, in a start/stop application, a battery may be discharged without sufficient periods of charging to fully recharge.

Referring to FIG. 14A, when the vehicle engine is ON, switches 75 and 77 can be in a closed position. In this mode of operation, both the battery 30 and the capacitor 20 can be charged from the alternator 61 to a voltage, ranging for example, in a vehicle application, from between approximately 12 and 16 V, or an average of about 14.4V. A vehicle OFF state can be detected, for example, when the alternator 61 or other power source otherwise stops delivering sufficient charging voltage. In some embodiments, the vehicle OFF state can be detected through inputs $I_b$, $I_{vb}$, and/or other input(s) to the charge controller 74. Once the alternator 61 stops delivering charging voltage to the battery 30, the voltage of the battery 30 may drop under load to a reduced output voltage, depending on its state of charge at the point the alternator 61 stops. To prevent the capacitor 20 from being discharged to this open circuit voltage of the battery 30, switch 75 can be opened, for example, through output signal $O_a$ from the charge controller 74, to isolate the capacitor 20 from the battery 30 and terminal 48. In some embodiments, switch 75 can remain open during the entire time the vehicle is turned OFF. However, it will be understood that some embodiments can allow switch 75 to close for a period of time when the vehicle is OFF, and still provide the improved starting function described herein.

The charge controller 74 can be configured to detect an event, for example, of the starter 60 cranking, by monitoring $I_b$, the current out of the energy storage device 900, the rate of change of the current output (dI/dt) and/or the change in voltage of the battery 20 (dV/dt), or a combination thereof.

When the event is detected, switch 75 can be closed such that the capacitor 20 can supply power to the starter 60. Because the capacitor 20 was previously at least partially isolated from the battery open circuit voltage during periods when switch 75 was open, once switch 75 is closed during startup, the capacitor 20 can provide voltage to the starter 60 at a higher voltage than the battery open circuit voltage. Such higher voltage provided by the capacitor 20 can increase crank speed of the starter 60, and improve the reliability with which the starter 60 will start a vehicle.

For example, as described above, in a vehicle application, the charge voltage of the battery 30 and capacitor 20 while the alternator 61 is running may range between approximately 12 and 16V, with an average of approximately 14.4V. After a stop condition of the alternator 61, the battery open circuit voltage may drop to a point between approximately 12 and 13V. Through the aforementioned control of switch 75, and the capacitor's tendency to retain its state of charge, the drop in the open circuit voltage of the capacitor 20 may be less than that of the battery 30. Thus, the capacitor 20 may remain at an increased open circuit voltage during the stop condition of the alternator 61 relative to that of the battery 30, and can provide increased voltage and starting power during vehicle startup. It is noted that in embodiments where optional switch 77 is not present, the battery 30 will contribute to a reduced portion of the starting current in parallel with the capacitor 20, upon the closing of switch 75 and the use of the capacitor 20 during the starter 60 crank.

In some embodiments, the voltage of the capacitor 20 when the alternator 61 is OFF may be reduced from that when the alternator 61 is running, based upon a voltage drop over the rectifier 63. However, in some embodiments an "ideal diode" circuit can be implemented. Such a circuit can monitor the voltage on both sides of switch 75 when the alternator 61 is on. The circuit can close switch 75 when the voltage on the alternator 61 side of switch 75 reaches a monitored level. Closing switch 75 can bypass the rectifier 63 and allow the voltage of the capacitor 20 to increase and approach that of the alternator 61. In such an embodiment, when the alternator 61 is OFF, and switch 75 is opened, the capacitor 20 can remain at an open circuit voltage approximately the same as the voltage of the alternator 61.

In embodiments including optional switch 77, switch 77 can be opened, for example, by the charge controller 74, to disconnect current being supplied from the battery 30, and thus isolate the capacitor 20 and battery 30. For example, switch 77 can be open during periods that switch 75 has been closed to isolate the capacitor 30 from the battery 20, and allow only the increased capacitor voltage (and power) to crank the starter 60 during the aforementioned vehicle start. It may also be desired to supply power from the capacitor to one or more other vehicle loads, such as emergency lighting. Switch 77 can be closed again, for example, when the capacitor voltage is approximately equal to the battery voltage or when the end of a cranking event has been detected. The aforementioned isolation can reduce the load on the battery during engine crank, thus improving the life of the battery 30, for example, during start/stop applications, and reducing cycling down effects. Such isolation can also provide an overall higher energy to the starter 60 from the capacitor 20, with the battery 30 at least partially isolated from the starting current.

Recuperate braking energy

Some embodiments can provide additional functionality in a hybrid vehicle, a vehicle with an internal combustion engine, or other vehicles equipped with a starter 60. For example, some vehicles may include a starter 60 generator, with the ability to generate, and thus recuperate or regenerate, energy when the vehicle is braking. However, many battery chemistries have a lower charge acceptance than a capacitor or ultracapacitor, and thus batteries may have lower efficiency than a capacitor in receiving and storing such regenerated braking energy. The following embodiments can allow some or substantially all of the regenerated braking energy to be directed to the capacitor instead of the battery, to improve the efficiency in the regenerated braking and mitigate the limitations in charge acceptance that a battery may impart to the energy storage device.

When the vehicle engine is ON, switches 75 and 77 can be configured in a closed position. During this mode of operation, both the battery 30 and the capacitor 20 can be charged by the alternator 61 to a voltage, ranging from 12-16V, or typically a 14.4V average in a typical vehicular application, as described above. The charge controller 74 can detect that a regenerative braking event is initiated by detecting a significant increase in voltage relative to that provided by the alternator 61. For example, in the aforementioned typical vehicular application, the average voltage during a regenerative braking event may increase to a range between approximately 14.4V and 18V. However, it will be understood that voltage during a regenerative braking event may increase up to any point within the voltage limitations in which the regenerative braking system is employed. When the charge controller 74 detects that a regenerative braking event is taking place, switch 77 can be opened to direct the regenerative braking energy only to the capacitor 20. Such capacitor isolation can allow the energy captured in the capacitor to be stored and then used in the next cranking event (for example, for a vehicle with start/stop functionality), to provide power to other auxiliary loads in the vehicle (such as lighting, air conditioning, cabin heating and the like), or to recharge the battery 30 by closing switch 75. In some embodiments, when the capacitor voltage is detected to be at a point indicating that the capacitor 20 has reached a full state of charge, switch 75 can be opened again and switch 77 can be closed, isolating the capacitor 20 from the system, and redirecting the regenerative braking energy to the battery 30. In some embodiments, both switch 75 and switch 77 can be closed in a regenerative braking event, to allow the regenerative braking energy to be directed to both the capacitor 20 and battery 30. In such an embodiment, the regenerative braking energy and current may be split between the capacitor and battery.

Trickle charging the battery from the capacitor to reduce cycle-down effect

In some embodiments, when the vehicle engine is ON, switches 75 and 77 are in a closed position. In this mode of operation, both the battery 30 and the capacitor 20 can be charged from the alternator 61 with a charge voltage ranging from 12-16V, or a typical average charge voltage of 14.4V. In some embodiments, the charge controller 74 can detect that the vehicle is turned OFF when the alternator 61 is no longer delivering sufficient charging voltage. At this point, switch 75 can open to reduce the likelihood or prevent the capacitor 20 from discharging to the battery 30 and the other loads connected to the battery 30 (or terminal 48). Prior to being shut off from the charging voltage supply from the alternator 61, the battery 30 generally maintains a reasonably high state of charge.

However, after the alternator 61 is shut off or removed as a charging source, the state of charge of the battery 30 may drop at the point the alternator 61 is turned off. For example, if the battery 30 is older, in a colder climate, or has been significantly discharged (such as in a start/stop application) without fully recharging prior to the alternator 61 being shut off, it is not uncommon for the battery's capacity to drop to a point ranging from 65-85% of its rated capacity. As is known, a battery capacity is measured in amp hours with a typical battery having a capacity of 60 amp-hours, although many batteries have more or less capacity depending on their cost and application. It is also not uncommon for the voltage of a battery to drop to approximately 12.4V when the alternator 61 is shut off. When a battery is nearing its end of life cycle, the charge may even decrease to 11.5V or less. In some cases, a battery voltage may drop to as low as 7V after the alternator 61 is shut off. These large voltage drops in the battery can reduce the battery's life or may be a sign that the battery is already at the end of its life cycle. Such scenarios can prevent or reduce the likelihood of a reliable starter 60 crank, or cause other problems described herein with respect to a low battery voltage.

Some embodiments can help compensate for the aforementioned problems with battery state of charge, capacity and voltage that can occur after the battery 30 loses its supply of power from the alternator 61. For example, switches 75 and 77 can be closed, allowing the capacitor 20 to supply energy to the battery 30, and thus restoring all or a portion of the previously-lowered state of charge or open circuit voltage of the battery 30. Such a "trickle charge" event of the capacitor 20 to the battery 30 can occur at various times after shutting down the alternator 61. However, it may be beneficial to close switch 75 and trickle charge the battery 30 within a relatively short time period (less than ten seconds) after the alternator 61 is shutoff, so as to maintain the voltage of the battery 30 closer to or approximately at its charging voltage, and reduce the likelihood of the voltage of the battery 30 from dropping significantly. Such an embodiment will reduce the amount of work required by the battery 30, and thus reduce wear on the battery 30, increase the battery's life, and improve the overall efficiency of the vehicle in which the combination capacitor/battery device 900 is employed. These embodiments can also have a positive effect on the charge acceptance of the battery 30 when resumed in operation. In sum, the work required from the voltage cycling is transferred to the capacitor, which is designed for such cycling, instead of the battery 30. When the battery 30 is trickle charged by the capacitor 20 in a start/stop application, such as a hybrid vehicle, the vehicle's fuel efficiency can be improved, due to the improved efficiencies of the battery 30.

The length of time in which switch 75 is closed (to trickle charge the battery 30 with the capacitor 20) may vary, but generally ranges from approximately one hour to approximately four hours. The trickle charge can be applied continuously, but can also be applied intermittently. For example, a trickle charge may be applied with a pulse-width-modulated (PWM) control, which may get rid of surface ion layers within the battery plates, allowing the battery to charge more quickly. A trickle charge may also be applied to the battery a single time while a vehicle is at rest, or several times over a given time period.

In a test using a trickle charge of a battery with an ultracapacitor, a group 31 AGM Pb battery was "cycled down" to 12.45 OCV, and was allowed to stand for two months. At this point, the battery's charge acceptance was measured at 6 amps at 14.4V at 45 degrees F. For five consecutive days, the battery received 4 approximately evenly spaced charges from an ultracapacitor that was initially charged to 14.4V. The new OCV of the battery after receiving such trickle charges from the capacitor was measured at 12.64V. When the battery was discharged back to 12.45V, the measured charge acceptance of the battery was 28 amps. This test demonstrates the benefit in charge acceptance to a cycled down battery in response to a trickle charge. The related efficiencies that such benefits of the trickle charge described herein may reduce the amount of work required by a battery in a typical start/stop application of a hybrid vehicle by 200-250 amp hours over a year of normal use.

The amount of voltage in the capacitor 20 and battery 30 can be monitored during the trickle charge, to prevent the trickle charge from dropping the capacitor 20 and battery 30 voltage from dropping to a point below which the starter 60 cannot start (about 12V). If the voltage reaches such a low voltage point during a trickle charge, the charge controller 74 can re-open switch 75, and retain enough voltage in the capacitor 20 to start the starter 60.

One or more of the aforementioned functions with respect to the system in FIG. 14A can be provided in the other two-terminal, two switch embodiment of FIG. 14B, or the three-terminal configuration shown in FIG. 15 with only switch 75 and the rectifier 63. An advantage of the embodiments shown in FIGS. 14A and 14B is that they are two-terminal designs, and may more easily replace existing two-terminal OEM batteries. However, the three-terminal embodiment can provide some similar functionality, in a simpler application, for example, without switch 77. Such embodiments can separate the current flow from the capacitor 20 from that of the battery 30, and allow the starter 60 to receive a higher voltage from only the capacitor 20 (when switch 75 is open). Such embodiments can provide similar benefit as the embodiments shown in FIG. 14A and described herein in the section entitled "Improved Start Function." Additionally, switch 75 can be moved to an open position, to direct energy from regenerative braking to the capacitor 20 only, or switch 75 can be moved to the closed position, to direct energy from the regenerative braking to both the capacitor 20 and the battery 30, to provide similar benefit as the embodiments shown in FIG. 14 and described herein in the section entitled "Recuperate braking energy." Additionally, switch 75 can be moved to a closed position, to allow the capacitor 20 to trickle charge the battery, to provide similar benefit as the embodiments shown in FIG. 14A and described herein in the section entitled "Trickle charging the battery from the capacitor to reduce cycle-down effect."

Resistive Bridge

Figure 16:
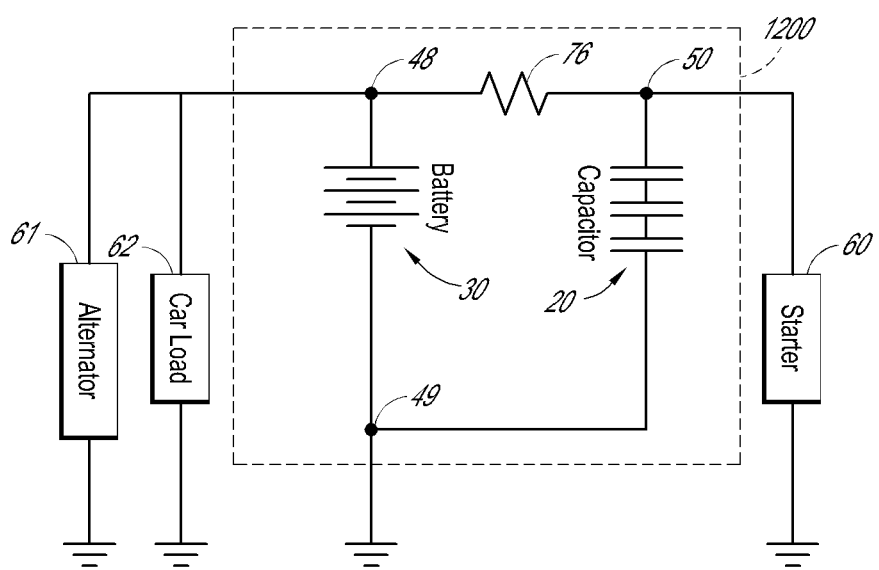
FIG. 16 is a schematic diagram illustrating an embodiment of a three-terminal capacitor/battery combination energy storage device with a current limiter between two of the terminals.

FIG. 16 shows another embodiment of a three-terminal combined battery/capacitor energy storage device 1200, with many similar components as FIGS. 9-15. The electronics schematically shown for the capacitor/battery combination device 1200 can be implemented within the other three-terminal capacitor/battery combination devices described herein. In this embodiment, a current limiter 76 can be positioned between starter terminal 50 and alternator terminal 48. In some embodiments, device 1200 can comprise a two-terminal device, similar to those other two-terminal devices described herein. For example, device 1200 can be configured without terminal 48, and with the current limiter positioned between terminal 50 and battery 30, and with the alternator 61 and car load 62 connected to terminal 50. The current limiter 76 can comprise a resistive bridge comprising one or more resistors. The current limiter 76 can comprise one or more positive-temperature-coefficient resistors, a self-resetting circuit breaker, or another suitable current-limiting device. The current limiter 76 can reduce the current into the battery 30 during the crank of a starter by capacitor 20, similar to other embodiments of combined energy storage devices described herein, but with less components, lower cost, and increased reliability. The resistance of current limiter 76 can be sized based upon the sizing, load profile, and inherent resistance of the battery 30 and the ESR of the capacitor 20. Generally the current limiter 76 can be sized suitably large enough to provide the aforementioned benefits of reducing the current draw from the battery, without being so large that the recharge rate of the capacitor would be decreased below a useful value. In general, the current limiter should be sized so the system time constant (the resistance times the capacitance) is approximately 10 to 100 times larger than the duration of the peak power demand of the system. In most automotive applications, the peak power demand lasts between approximately 1 and 10 seconds so the current limiter should be sized such that the time constant of device 1200 is between approximately 10 and 1000 seconds. In some embodiments, the time constants for device 1200 can be between approximately 1 and 10,000 seconds. For example, a resistive bridge rated to 2000 W or more can be implemented within a combined battery/capacitor device that includes a battery with an open circuit voltage of 288V, and a capacitor in parallel with approximately 24 F of capacitance. The current limiter 76 can be implemented in addition to one or more of the other embodiments described in FIGS. 9-15.

Rectifier Network

Figure 17:
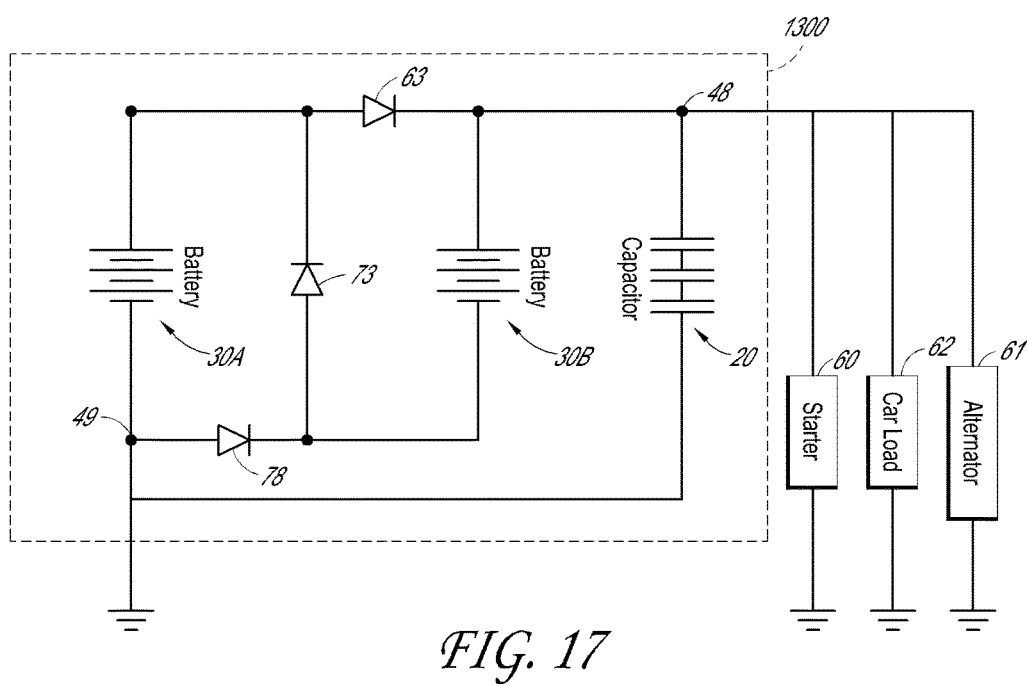
FIG. 17 is a schematic diagram illustrating an embodiment of a three-terminal capacitor/battery combination energy storage device with a network of rectifiers.

FIG. 17 shows another embodiment of a two-terminal combined battery/capacitor energy storage device 1300, with many similar components as FIGS. 9-16. The electronics schematically shown for the capacitor/battery combination device 1300 can be implemented within the other two-terminal capacitor/battery combination devices described herein. In this embodiment, device 1300 includes a network of rectifiers 63, 73, and 78 running in a string between two batteries 30A and 30B connected in parallel. Batteries 30A and 30B can be of approximately the same rated voltage and capacity. The system of rectifiers 63, 73 and 78, and batteries 30A and 30B can be connected in parallel with capacitor 20.

The embodiment of device 1300 shown in FIG. 17 can provide some of the benefits as those combination devices described herein that include a DC/DC converter or switched system, such as those shown in FIGS. 11-15. For example, batteries 30A and 30B can work in parallel to power the car load 62 when the capacitor 20 is depleted below a certain level, such as at or below the rated voltage of batteries 30A and 30B. During recharge, the capacitor 20 can receive the power first, until the capacitor 20 reaches a certain level, such as twice the rated voltage of batteries 30A and 30B. Subsequently, the power can be used to recharge the batteries 30A, 30B. The recharge of the batteries 30A, 30B is presumably at a lower effective rate, due to the batteries' higher internal resistance. The embodiment of device 1300 in FIG. 17 can be implemented with only solid state components, and thus may be simpler with respect to a device with a DC/DC converter or switched system. Thus, the embodiment of FIG. 17 can be more reliable, and may be provided at a lower cost than some other hybrid battery/capacitor energy storage devices.

Self-Balancing Device

Figure 18:
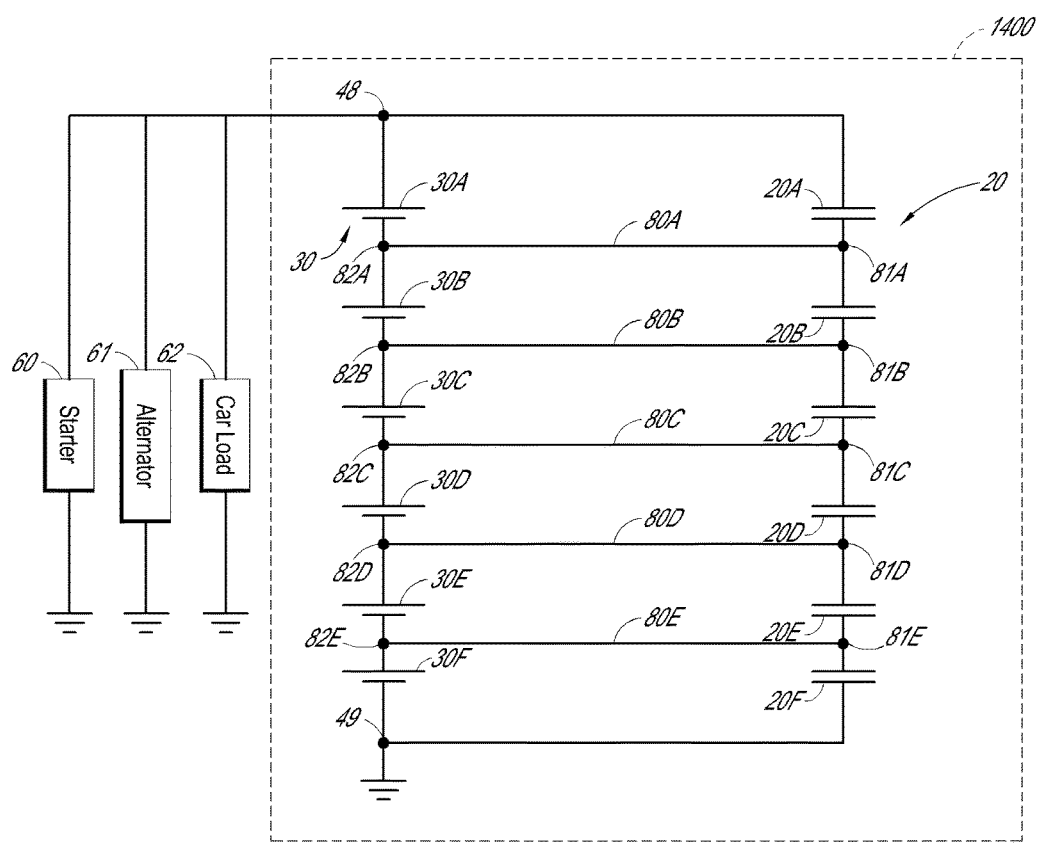
FIG. 18 is a schematic diagram illustrating another embodiment of a two-terminal capacitor/battery combination energy storage device with a capacitor bank and a battery bank.

FIG. 18 shows another embodiment of a two terminal combined battery/capacitor energy storage device 1400, with many similar components as FIGS. 9-17. The electronics schematically shown for the capacitor/battery combination device 1400 can be implemented within the other two-terminal capacitor/battery combination devices described herein. In this embodiment, capacitor 20 can comprise a capacitor bank with a plurality of capacitors 20A-20F connected in series, and battery 30 can comprise a battery bank with a plurality of batteries 30A-30F connected in series. In some embodiments, the number of capacitors and the number of batteries implemented within energy storage device 10 can be the same, to provide better balancing between the batteries and capacitors as described further below. A plurality of interconnects 80A-80E can extend between the capacitor 20 and battery 30, wherein each interconnect can include a first end connected between a corresponding adjacent pair of capacitors and a second end connected between a corresponding adjacent pair of batteries. For example, interconnect 80A can include a first end 81A connected at a point between capacitors 20A and 20B, and a second end 82A connected at a point between batteries 30A and 30B, and so forth, for the remainder of the interconnects, batteries, and capacitors. Interconnects 80A-80E can comprise a wire, bus bar or other electrical connection. Interconnects 80A-80E can comprise a wire, bus bar, or other electrical connection, without other electrical components extending between adjacent capacitors and batteries. In some embodiments, It will be understood that the number of batteries and capacitors shown (six) and the number of interconnects (five) are for illustrative purposes.

The embodiment of device 1400 shown in FIG. 18 can provide balancing of the voltage of individual capacitors 20A-20F within capacitor bank 20 relative to each other, and the overall output voltage of capacitor bank 20. The embodiment also can provide balancing of the voltage of individual batteries 30A-30F within battery bank 30 relative to each other, and the overall output voltage of battery bank 30. Such balancing can reduce the differences between the voltages of the individual capacitors and/or batteries. Such balancing can avoid certain capacitors or batteries being charged to a higher or lower voltage than other capacitors or batteries, which can have an impact on the service life of the capacitor 20, battery 30, or the hybrid energy storage device 1400. Such balancing can also prevent complete failure of the overall capacitor bank 20 or battery bank 30 in the event of a failure of one or more individual capacitors 20A-20F and batteries 30A-30F. The balancing circuit in FIG. 18 is simpler, less expensive, and more robust than some balancing circuits that provide similar function, but with more complexity, such as switches, controllers, and the like.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Embodiments of the invention described herein can include any of a number of different software, hardware, firmware, electronic circuits, controllers, computers (including hand-held computing devices), microchips, integrated circuits, printed circuit boards, and/or other microelectronic component known or described herein, or combinations thereof, and methods related thereto, suitable to provide the functionality described herein. Additionally, the functionality described herein for managing a capacitor system can be provided through any suitable electronic, mechanical, pneumatic, hydraulic, and/or other components and/or systems, or combinations thereof, or methods related thereto.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An energy storage device, comprising:
   a first device terminal and a second device terminal;
   a battery connected between the first device terminal and the second device terminal;
   a capacitor connected in parallel with the battery;
   a first switch between the capacitor and the first device terminal, the first switch configured to selectively control electrical communication between the capacitor and the first device terminal; and
   a controller configured to:
      close the first switch in response to detection of a loss of external power to the first device terminal, and
      open the first switch after the first switch has been closed for a predetermined period of time.

2. The energy storage device of claim 1, further comprising a rectifier connected between the first device terminal and the capacitor, the rectifier configured to allow substantially unidirectional current flow from the first device terminal to the capacitor.

3. The energy storage device of claim 2, wherein the rectifier comprises a diode.

4. The energy storage device of claim 1, wherein the controller is further configured to open the first switch when an output voltage of the battery drops below a threshold.

5. The energy storage device of claim 1, further comprising a second switch between the battery and the first device terminal, the second switch configured to selectively control electrical communication between the battery and the first device terminal.

6. The energy storage device of claim 5, wherein the controller is further configured to close the first switch and open the second switch when a voltage of the first device terminal increases above a first threshold.

7. The energy storage device of claim 6, wherein the controller is further configured to close the second switch when an output voltage of the capacitor is above a second threshold.

8. The energy storage device of claim 1, wherein the first switch is parallel with a rectifier.

9. The energy storage device of claim 8, further comprising:
   a third device terminal between the rectifier and the capacitor;
   wherein the first switch is positioned between the first device terminal and the third device terminal.

10. The energy storage device of claim 1, further comprising a third device terminal configured to provide power from the capacitor to an external device, wherein a current limiter extends between the first device terminal and the third device terminal.

11. The energy storage device of claim 10, wherein the current limiter comprises at least one of a positive-temperature-coefficient resistor and a resistive bridge.

12. The energy storage device of claim 8, further comprising a current limiter connected in series between the rectifier and the capacitor.

13. The energy storage device of claim 12, wherein the current limiter comprises a positive-temperature-coefficient resistor.

14. The energy storage device of claim 1, further comprising a DC/DC converter connected between the first device terminal and a third device terminal positioned between the first device terminal and the capacitor, the DC/DC converter comprising:
   a rectifier;
   a switch connected between the second device terminal and the rectifier;
   a boost controller configured to control the switch; and
   an inductor connected in series with the rectifier between the first device terminal and the rectifier.

15. The energy storage device of claim 14, wherein the rectifier comprises a first rectifier, further comprising a second rectifier connected between the first device terminal and the third device terminal, and in parallel with the first rectifier and the inductor.

16. The energy storage device of claim 14, wherein the inductor comprises a saturable inductor.

17. The energy storage device of claim 1, further comprising:
   a housing comprising an integrated battery housing portion, a capacitor housing portion, and a housing lid, wherein the battery is contained within the integrated battery housing portion, wherein the capacitor is connected in parallel with the battery and contained within the capacitor housing portion, and wherein the first device terminal and the second device terminal extend through the housing.

18. An energy storage device, comprising:
   a first device terminal and a second device terminal;
   a battery connected between the first device terminal and the second device terminal;
   a capacitor connected in parallel with the battery;
   a first switch between the capacitor and the first device terminal, the first switch configured to selectively control electrical communication between the capacitor and the first device terminal;
   a second switch between the battery and the first device terminal, the second switch configured to selectively control electrical communication between the battery and the first device terminal; and
   a controller configured to:
      close the first switch and open the second switch when a voltage of the first device terminal increases above a first threshold, and
      close the second switch when an output voltage of the capacitor is above a second threshold.

19. The energy storage device of claim 18, further comprising a rectifier connected between the first device terminal and the capacitor, the rectifier configured to allow substantially unidirectional current flow from the first device terminal to the capacitor.

20. The energy storage device of claim 19, wherein the rectifier comprises a diode.

21. The energy storage device of claim 18, wherein the first switch is parallel with a rectifier.

22. The energy storage device of claim 21, further comprising:
   a third device terminal between the rectifier and the capacitor;
   wherein the first switch is positioned between the first device terminal and the third device terminal.

23. An energy storage device, comprising:
   a first device terminal and a second device terminal;
   a battery connected between the first terminal and the second terminal;
   a capacitor connected in parallel with the battery;
   a first switch between the capacitor and the first terminal, the first switch configured to selectively control electrical communication between the capacitor and the first terminal; and
   a DC/DC converter connected between the first device terminal and a third device terminal positioned between the first device terminal and the capacitor, the DC/DC converter comprising:
   a first rectifier;
   a second switch connected between the second device terminal and the first rectifier;
   a boost controller configured to control the switch;
   an inductor connected in series with the first rectifier between the first device terminal and the first rectifier; and
   a second rectifier connected between the first device terminal and the third device terminal and in parallel with the first rectifier and the inductor.

24. The energy storage device of claim 15, wherein the inductor comprises a saturable inductor.

25. The energy storage device of claim 23, wherein the second rectifier is connected between the first device terminal and the capacitor and is configured to allow substantially unidirectional current flow from the first device terminal to the capacitor.

26. The energy storage device of claim 23, wherein at least one of the first rectifier and the second rectifier comprises a diode.

27. The energy storage device of claim 23, wherein the first switch is parallel with the second rectifier.

28. The energy storage device of claim 23, wherein the first switch is positioned between the first device terminal and the third device terminal.

* * * * *